United States Patent
Yamada et al.

(10) Patent No.: US 8,279,523 B2
(45) Date of Patent: Oct. 2, 2012

(54) POLARIZATION CONVERSION ELEMENT AND METHOD FOR MANUFACTURING THE SAME

(75) Inventors: Kohei Yamada, Minowa-machi (JP); Isamu Aoki, Shimosuwa-machi (JP); Shuho Kobayashi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 689 days.

(21) Appl. No.: 12/195,866

(22) Filed: Aug. 21, 2008

(65) Prior Publication Data

US 2009/0052031 A1    Feb. 26, 2009

(30) Foreign Application Priority Data

Aug. 22, 2007 (JP) ................................ 2007-215613
Oct. 4, 2007 (JP) ................................ 2007-260621
Jun. 16, 2008 (JP) ................................ 2008-156293

(51) Int. Cl.
    *G02B 5/30* (2006.01)
(52) U.S. Cl. .................. 359/485.04; 359/489.08
(58) Field of Classification Search ............ 359/485.01, 359/485.03, 485.04, 487.05, 489.07, 489.08, 359/489.11, 489.15–489.17
    See application file for complete search history.

(56) References Cited

U.S. PATENT DOCUMENTS

| | | | |
|---|---|---|---|
| 5,096,520 A * | 3/1992 | Faris | 156/99 |
| 5,566,367 A | 10/1996 | Mitsutake et al. | |
| 6,023,370 A * | 2/2000 | Lin | 359/485.04 |
| 6,084,714 A * | 7/2000 | Ushiyama et al. | 359/627 |
| 6,229,646 B1 | 5/2001 | Mitsutake et al. | |
| 6,404,550 B1 * | 6/2002 | Yajima | 359/485.04 |
| 6,445,500 B1 * | 9/2002 | Itoh | 359/485.02 |
| 6,523,962 B2 * | 2/2003 | Yajima | 353/121 |
| 6,669,797 B2 * | 12/2003 | Murata | 156/99 |
| 6,846,079 B2 * | 1/2005 | Ogawa et al. | 353/20 |
| 7,011,412 B2 * | 3/2006 | Ogawa et al. | 353/20 |
| 7,119,957 B2 * | 10/2006 | Itoh et al. | 359/489.07 |
| 7,280,275 B2 * | 10/2007 | Schluchter et al. | 359/485.04 |
| 2002/0145800 A1 * | 10/2002 | Kane | 359/485 |

FOREIGN PATENT DOCUMENTS

| | | |
|---|---|---|
| JP | A-04-310903 | 11/1992 |
| JP | A-05-072417 | 3/1993 |
| JP | A-10-090520 | 4/1998 |
| JP | A-2003-167125 | 6/2003 |
| JP | A-2003-302523 | 10/2003 |
| JP | A-2004-145305 | 5/2004 |
| JP | A-2004-170550 | 6/2004 |

* cited by examiner

*Primary Examiner* — Frank Font
(74) *Attorney, Agent, or Firm* — Oliff & Berridge, PLC

(57) ABSTRACT

A polarization conversion element includes: a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer. In the element, the polarization separation film and the air layer are alternately formed along the plurality of inclined planes.

17 Claims, 19 Drawing Sheets

POLARIZATION CONVERSION ELEMENT AND METHOD FOR MANUFACTURING THE SAME

BACKGROUND

1. Technical Field

The present invention relates to a polarization conversion element and a method for manufacturing a polarization conversion element that converts light vibrating in various directions into light vibrating in a single polarization direction.

2. Related Art

Polarization conversion elements are known as an optical element that converts light vibrating in various directions into light vibrating in a single polarization direction.

FIGS. 22A and 22B are schematic views for describing a related art common polarization conversion element. FIG. 22A is a perspective view of the polarization conversion element and FIG. 22B is a plan view of the polarization conversion element of FIG. 22A viewed from +z direction. Referring to FIGS. 22A and 22B, this polarization conversion element 50 includes a polarization separation element 51 and a half λ retardation plate 52. The polarization separation element 51 separates incident light into two types of polarized light. The half λ retardation plate 52 is selectively disposed on a light emitting side of the polarization separation element 51 and converts one of the two types of polarized light into the other type of polarized light. Light is incident on the polarization conversion element 50 in a manner that a major light beam (central axis) of the light is nearly parallel to a system optical axis AL.

The polarization separation element 51 includes a light incident face, a light emitting face, a plurality of glass materials 51a as light transmitting base materials, a plurality of polarization separation films 51b (shown in a solid line in the figure), and a plurality of reflection films 51c (shown in a dashed line in the figure). The light incident face is nearly orthogonal to the system optical axis AL, and the light emitting face is nearly parallel to the light incident face. The glass materials 51a are sequentially bonded on a plurality of inclined planes forming a predetermined angle with respect to the light incident face and the light emitting face. The polarization separation films 51b and the reflection films 51c are alternately formed on the plurality of inclined planes.

The predetermined angle of the plurality of inclined planes with respect to the light incident face (the light emitting face) is commonly 45°, and the glass materials 51a have a columnar shape extending in z axis direction and have a cross-sectional shape of an approximate parallelogram in x-y axis direction.

The polarization separation films 51b are composed of a dielectric multilayer film. The polarization separation films 51b separate a bundle of rays of incident light (including s-polarized light and p-polarized light) into a partial bundle of rays of s-polarized light (s-polarized light) and a partial bundle of rays of p-polarized light (p-polarized light), and reflects the s-polarized light and transmits the p-polarized light. On the other hand, the reflection films 51c are composed of a dielectric multilayer film or a metal film, and have a function of reflecting the s-polarized light being incident thereon. The half λ retardation plates 52 are provided in regions, through which the p-polarized light that transmits through the polarization separation film 51b passes, of the light emitting face of the glass materials 51 in a manner being arranged in a lattice. The half λ retardation plates 52 have a function of converting the p-polarized light being incident thereon into s-polarized light of which a polarization direction is orthogonal to that of the p-polarized light.

The polarization conversion element 50 is used with a light shielding plate 60 (shown in a dashed two dotted line in FIG. 22B) disposed on the light incident face thereof in order to make light that is incident thereon incident only on the polarization separation films 51b without making the light incident on the reflection films 51c. As the light shielding plate 60, a metal plate having a light shielding characteristic such as an aluminum plate and provided with openings 60a and light shielding parts 60b may be used.

In the polarization conversion element 50 structured as above, as shown in FIG. 22B, light (including s-polarized light and p-polarized light) incident on the glass materials 51a of the polarization separation element 51 through the openings 60a of the light shielding plate 60 is separated into two partial bundles of rays of the s-polarized light and the p-polarized light at the polarization separation films 51b. Then the s-polarized light obtained by separating the incident light at the polarization separation films 51b is reflected at the reflection films 51c, and the p-polarized light obtained by the separation transmits through the polarization separation films 51b so as to be converted into s-polarized light at the half λ retardation plate 52. That is, the s-polarized light that is a single type of polarized light obtained by the conversion in the polarization conversion element 50 is emitted nearly parallel to the system optical axis from the polarization conversion element 50.

JP-A-10-90520, as a first example, discloses the following manufacturing method in order to obtain a polarization conversion element of which a positional relation between light transmitting base materials is accurately set. The method includes a step of forming a polarization separation film on a first surface of a first light transmitting plate having the first surface and a second surface that are nearly parallel to each other; a step of forming a reflection film on the second surface; a step of alternately bonding a plurality of first light transmitting plates provided with the polarization separation film and the reflection film and a plurality of second light transmitting plates having two surfaces that are nearly parallel to each other; and a step of cutting the light transmitting plates obtained by alternately bonding the first plates and the second plates by a predetermined angle with respect to the first and second surfaces so as to produce optical blocks having a light incident face and a light emitting face that are nearly parallel to each other.

With respect to the common polarization conversion element mentioned above, JP-A-2004-170550, as a second example, discloses the following polarization conversion element. The polarization conversion element includes an incident face on which light is incident, a polarization separation face, a transmitting light emitting face, a reflection face, and a reflected light emitting face. The polarization separation face is disposed at an angle of approximately 45° with respect to the incident face. The transmitting light emitting face is provided to a position opposed to the incident face so as to be nearly parallel to the incident face, being an emitting part of transmitting light through the polarization separation face. The reflection face is disposed nearly parallel to the polarization separation face and further reflects a component reflected by the polarization separation face. The reflected light emitting face is disposed nearly parallel to the incident face and emits a reflected component. In the polarization conversion element, a region surrounded by the incident face, the polarization separation face, the reflection face, and the reflected light emitting face is made of transparent medium and a region which is opposite to the region for the transparent medium through the reflection face is composed of air.

In the polarization conversion element of the second example, the transparent medium having a parallelogram cross-section and surrounded by the incident face, the polarization separation face, the reflection face, and the reflected light emitting face and a transparent medium having a rectangular triangle cross-section and surrounded by the polarization separation face, the transmitting light emitting face, and a face orthogonal to the incident face are bonded through the polarization separation face. Then a plurality of polarization conversion elements structured as this are aligned on one surface of a lens array so as to allow the incident face to be a light converging part of the lens array. Alternatively, the plurality of polarization conversion elements are bonded and fixed on one surface of the lens array in an aligning manner.

Therefore, individual polarization conversion element totally reflects incident light incident on the reflection face thereof without providing an expensive reflection film to the reflection face, being able to reduce reflection loss by the reflection face. However, since the region opposite to the region for the transparent medium having the parallelogram cross-section is composed of air, an air region becomes a cavity having a rectangular triangle shape when a plurality of polarization conversion elements are aligned. Accordingly, in order to accurately align incident faces of the plurality of polarization conversion elements on one surface of the lens array by a predetermined interval, the manufacturing process becomes complex and a large number of steps are required.

SUMMARY

An advantage of the present invention is to provide a polarization conversion element and a method for manufacturing a polarization conversion element that can accurately set a positional relation between light transmitting substrates and can totally reflect incident light incident on a reflection face without providing a reflection film so as to provide an excellent reflection performance.

A polarization conversion element according to a first aspect of the invention includes a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer. In the element, the polarization separation film and the air layer are alternately formed along the plurality of inclined planes.

According to the element of the first aspect, the polarization separation film separating incident light into two types of polarized light and the air layer are alternately provided along the plurality of inclined planes, which forms an angle of approximately 45° with respect to the light incident face and the light emitting face that is approximately parallel to the light incident face, of the plurality of light transmitting substrates. Therefore, one polarized light obtained by the separation by the polarization separation film to be incident on the inclined planes, to which the air gap is provided, is totally reflected. Then the one polarized light travels toward the light emitting face together with the other polarized light. One from the two types of polarized light passes through the retardation plate, so that polarized light vibrating in a single polarization direction is emitted from the light emitting face of the polarization conversion element. Thus the air layer is formed on the inclined planes of the light transmitting substrates, so that a reflection film composed of a related art dielectric multilayer film is not required to be formed, providing a polarization conversion element of which a manufacturing cost can be decreased and a manufacturing lead time can be shortened. The air layer can provide a 100% reflection (total reflection) compared to the dielectric multilayer film absorbing a part of incident light. Accordingly, a polarization conversion element having an excellent reflection performance (polarization conversion performance) can be obtained. Incidentally, it takes a long period of processing time of approximately 5 hours to form a multilayer film in which low refractive index layers and high refractive index layers that are made of dielectric substance are alternately layered to be about 40 layers.

In the polarization conversion element of the aspect, it is preferable that the retardation plate be a half wave plate and be selectively disposed along the light emitting face.

According to the aspect, the polarization separation film separating incident light into two types of polarized light and the air layer are alternately provided along the plurality of inclined plates forming an angle of approximately 45° with respect to the light incident face and the light emitting face that is approximately parallel to the light incident face. The retardation plate providing a phase difference to incident polarized light is composed of the half wave plate and is selectively disposed along the light emitting face. Accordingly, a polarization conversion element having an excellent polarization conversion performance by which light (including s-polarized light and p-polarized light) incident on the light incident face is converted into the s-polarized light that is a single type of polarized light so as to be emitted.

In the element of the aspect, it is preferable that the retardation plate be a quarter wave plate and be disposed adjacent to a light incident side, on which the polarized light obtained by the separation by the polarization separation film is incident, of the air layer that is formed on the inclined planes.

According to the aspect, the polarization separation film separating incident light into two types of polarized light and the air layer are alternately provided along the plurality of inclined planes forming an angle of approximately 45° with respect to the light incident face and the light emitting face that is approximately parallel to the light incident face. The retardation plate providing a phase difference to incident polarized light is composed of the quarter wave plate and is disposed adjacent to the light incident side, on which the polarized light obtained by the separation by the polarization separation film, of the air layer. Accordingly, the polarization conversion element can handle incident light in a wide range incident angle and can convert light (including s-polarized light and p-polarized light) incident on the light incident face into the p-polarized light that is a single type of polarized light so as to emit it. Thus a polarization conversion element having an excellent polarization conversion performance can be obtained. Further, since the retardation plate is disposed inside the polarization conversion element, a polarization conversion element having an excellent thermal resistance and light resistance can be obtained.

In the polarization conversion element of the aspect, it is preferable that the retardation plate be a half wave plate and be disposed adjacent to a light emitting side of the polarization separation film formed on the inclined planes. According to the aspect, the polarization separation film separating incident light into two types of polarized light and the air layer are alternately provided along the plurality of inclined plates forming an angle of approximately 45° with respect to the light incident face and the light emitting face that is approximately parallel to the light incident face. The retardation plate providing a phase difference to incident polarized light is composed of the half wave plate and is disposed adjacent to the light emitting face, through which polarized light transmits, of the polarization separation film provided to the inclined planes. Accordingly, a polarization conversion element having an excellent polarization conversion performance by which light (including s-polarized light and p-polarized light) incident on the light incident face is converted into the s-polarized light that is a single type of polarized light so as to be emitted. Further, since the retardation plate is disposed inside the polarization conversion element, a polarization conversion element having an excellent thermal resistance and light resistance can be obtained.

In the polarization conversion element of the aspect, it is preferable that the air layer have an interval of at least 1 μm with respect to incident light in a visible light wavelength range from approximately 400 nm to approximately 700 nm. According to the aspect, the air layer formed on the inclined planes of the light transmitting substrates that are adjacent each other has an interval of at least 1 μm with respect to incident light in a visible light wavelength range of approximately 400 nm to approximately 700 nm. Therefore, incident polarized light can be totally reflected without allowing evanescent light of polarized light incident on the inclined planes of the light transmitting substrate and the air layer to diffuse to another light transmitting substrate that is adjacent across the air layer. Accordingly, a polarization separation element and a polarization conversion element having an excellent reflection performance (polarization conversion performance) can be obtained.

In the polarization conversion element of the aspect, it is preferable that a refractive index of the light transmitting substrates be 1.45 or more, and less than 1.65.

According to the aspect, the refractive index of the light transmitting substrate is 1.45 or more, and less than 1.65, being able to totally reflect one polarized light obtained by the separation by the polarization separation film to be incident on the inclined planes of the light transmitting substrate provided with the air layer. Accordingly, a polarization separation element and a polarization conversion element having an excellent reflection performance can be obtained.

In the polarization conversion element of the aspect, it is preferable that a spacer forming the air layer be formed at both end parts in a longitudinal direction of the inclined planes, and the air layer sandwiched by the plurality of light transmitting substrates be exposed at each of the light incident face and the light emitting face.

According to the aspect, the spacer forming the air layer is formed on both end parts in the longitudinal direction of the inclined planes and the air layer sandwiched by the plurality of light transmitting plates is exposed at the light incident face and the light emitting face, being able to widely use the whole region of the inclined planes as a light functioning face. Therefore, a reflection performance in which light-use efficiency (polarization conversion performance) is high can be obtained.

In the polarization conversion element of the aspect, it is preferable that a spacer forming the air layer be formed along the light incident face and the light emitting face.

According to the aspect, the spacer forming the air layer is formed along each of the light incident face and the light emitting face, being able to provide the air layer having an interval that is uniform and stable on the whole inclined plane. Accordingly, the air layer can be formed on the plurality of inclined planes of the light transmitting substrates that are adjacent each other in high degree of parallelization, providing a polarization conversion element having reflection performance in which an optical axis (polarization conversion performance) is stabilized.

In the polarization conversion element of the aspect, it is preferable that a spacer forming the air layer be formed along a whole periphery of the inclined planes.

According to the aspect, the air layer is formed to be sealed, so that no humidity (moisture) or no fine powder under the use environment permeates or attaches the air layer, being able to maintain high reflection performance (polarization conversion performance) for a long period of time.

A method for manufacturing a polarization conversion element that includes a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer, in which the polarization separation film and the air layer are alternately formed along the plurality of inclined planes, according to a second aspect of the invention, the method includes forming a convex portion on the inclined planes so as to form the air layer.

According to the method of the second aspect, the convex portion is formed on the inclined planes forming an angle of approximately 45° with respect to the light incident face and the light emitting face that is nearly parallel to the light incident face. Therefore, such air layer that totally reflects-polarized light obtained by separation by the polarization separation film and being incident on the inclined planes can be easily formed.

In the method of the aspect, it is preferable that the convex portion be formed by an adhesive layer used for bonding the inclined planes.

According to the method of the aspect, the convex portion serving as a step forming means and forming the air layer is formed by the adhesive layer that bonds the light transmitting substrates adjacent each other. Therefore, a manufacturing process does not become complex and the number of steps is not increased, being able to easily obtain a polarization conversion element in which the air layer totally reflecting incident polarized light is formed.

A method for manufacturing a polarization conversion element that includes a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer, in which the polarization separation film and the air layer are alternately formed along the plurality of inclined planes, according to a third aspect of the invention, the method includes forming a concave portion on the inclined planes so as to form the air layer.

According to the method of the third aspect, the concave portion is formed on the inclined planes forming an angle of approximately 45° with respect to the light incident face and the light emitting face that is approximately parallel to the light incident face. Therefore, such air layer that totally reflects-polarized light obtained by separating light by the polarization separation film and being incident on the inclined planes can be easily formed.

In the method of the aspect, it is preferable that the concave portion be formed by an etching method.

According to the method of the aspect, the concave portion forming the air layer is formed by the etching method, being able to obtain the air layer having a highly-accurate and stable interval. Accordingly, the air layer can be formed on the plurality of inclined planes of the light transmitting substrates that are adjacent each other in high degree of parallelization, providing a polarization conversion element having reflection performance in which an optical axis (polarization conversion performance) is stabilized.

In the method of the aspect, it is preferable that the concave portion be formed by a microblasting method.

According to the method of the aspect, the concave portion forming the air layer is formed by the microblasting method, being able to obtain the air layer having a highly-accurate and stable interval. Accordingly, the air layer can be formed on the plurality of inclined planes of the light transmitting substrates that are adjacent each other in high degree of parallelization, providing a polarization conversion element having reflection performance in which an optical axis (polarization conversion performance) is stabilized. Further, the microblasting method provides a grained face to a bottom surface and a side wall of the concave portion, and a face in a grained state blocks stray light and the like passing through the air layer by dispersing the light, providing a polarization conversion element having an excellent reflection performance (polarization conversion performance).

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the present invention will now be described with reference to the accompanying drawings.

Figure 1:
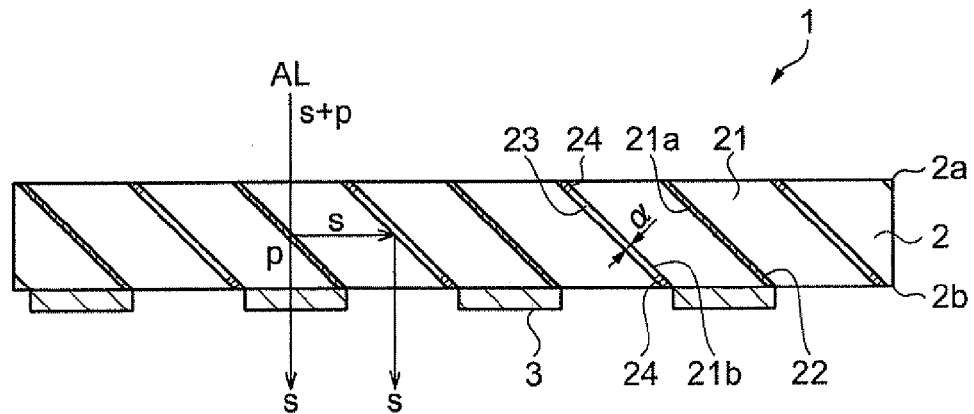
FIG. 1 is a sectional view schematically showing a polarization conversion element according to a first embodiment.
Figure 2:
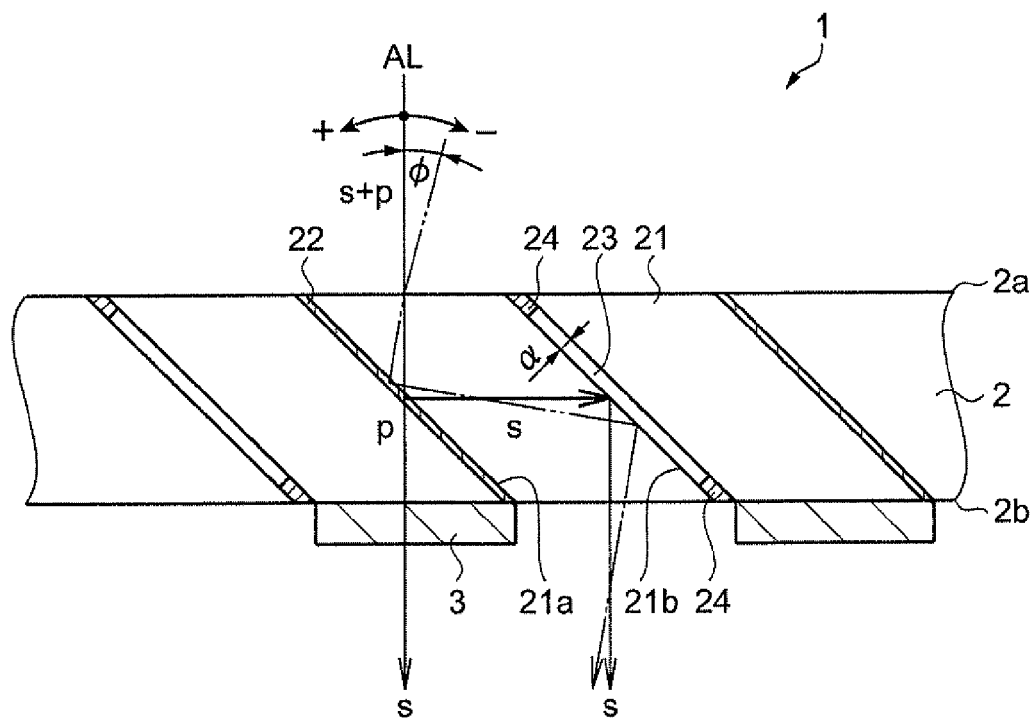
FIG. 2 is an enlarged sectional view showing a part of the polarization conversion element according to the first embodiment.

FIG. 1 is a sectional view schematically showing a structure of a polarization conversion element according to a first embodiment and FIG. 2 is an enlarged sectional view showing a part of the polarization conversion element according to the first embodiment. Here, these figures show each element having different size or proportion from the real one for the convenience of the description below.

Referring to FIG. 1, this polarization conversion element 1 includes a polarization separation element (PBS) 2 and a retardation plate 3. The polarization separation element 2 separates incident light into two types of polarized light and the retardation plate 3 is selectively disposed on one surface of the polarization separation element 2. The polarization conversion element 1 has a light incident face 2a and a light emitting face 2b that is nearly parallel to the light incident face 2a on the polarization separation element 2. On the light emitting face 2b, a large number of retardation plates 3 are bonded.

The polarization separation element 2 is composed of glass materials 21 as light transmitting base materials, polarization separation films 22, and air gap layers 23 as air layers. The glass materials 21 have a columnar shape (but has a triangle shape at both end parts) and are sequentially bonded at a plurality of inclined planes (interfacial surfaces) forming a predetermined angle with respect to the light incident face 2a and the light emitting face 2b. The polarization separation films 22 and the air gap layers 23 are alternately provided along the plurality of inclined planes. An angle of the plurality of inclined planes with respect to the light incident face 2a and the light emitting face 2b is, for example, 45°. A cross-sectional shape of the glass materials 21 is an approximate parallelogram.

The glass materials 21 have the cross-sectional view of an approximate parallelogram formed by opposed faces of the light incident face 2a and the light emitting face 2b, and opposed faces of a polarization separation face 21a and a reflection face 21b. On inclined planes, at the polarization separation face 21a of the glass materials 21 that are adjacent, the polarization separation film 22 is formed. That is, the polarization separation film 22 is formed on a first polarization separation face 21a of a first of the glass material 21 and a second polarization separation face 21a, which is adjacent to the first polarization separation face 21a, of a second of the glass material 21 is bonded to the polarization separation film 21a of the first of the glass material 21 with an adhesive (not shown). The glass material 21 of the embodiment is made of white sheet glass, for example. A refractive index of the white sheet glass (B270) is 1.52.

The glass material 21 will be later described in detail, but the glass material 21 is not limited as long as it is a light transmitting base material having a refractive index greater or equal to 1.45 and less than 1.65. The glass material 21 may be borosilicate glass, blue sheet glass, optical glass, or the like.

The polarization separation film 22 is a dielectric multilayer film. The dielectric multilayer film is, for example, a multilayer film that is formed such that a low refractive index layer made of $SiO_2$, a low refractive index layer made of $MgF_2$, and a high refractive index layer made of a mixture containing $La_2O_3$ and $Al_2O_3$ in a weight ratio of 1:3 are layered in a predetermined order and in a predetermined optical film thickness. The polarization separation film 22 separates a bundle of rays of incident light (including s-polarized light and p-polarized light) into a partial bundle of rays of s-polarized light (s-polarized light) and a partial bundle of rays of p-polarized light (p-polarized light), and reflects the s-polarized light and transmits the p-polarized light.

The air gap layers 23 are layers of air, and are formed by spacers 24 serving as step forming means and formed on inclined planes at the reflection faces 21b of the glass materials 21 that are adjacent each other. The spacers 24 are made of an adhesive (adhesive layer) bonding the glass materials 21 that are adjacent each other to be formed at both end parts, which are at the light incident face 2a and the light emitting face 2b, of the inclined planes at the reflection faces 21b. A height of the spacers 24 with respect to the reflection face 21b (height in an orthogonal direction from the reflection face 21b) is about 10 µm. Namely, a width of the air gap layer 23, formed between the reflection faces 21b of the glass materials 21 that are adjacent each other, in an orthogonal direction to the reflection faces 21b, that is, an interval α is about 10 µm. Here, a same advantageous effect can be obtained also in a case where the air gap layer 23 is a nitrogen gas layer. The air gap layer 23 will be later described in detail.

The retardation plates 3 are made of quartz (are quartz plates) having half λ retardation function. The quartz plates are single crystal of $SiO_2$, and may be synthetic quartz or natural quartz. The retardation plates 3 are bonded only to regions, through which the p-polarized light that transmits through the polarization separation film 22 passes, of the light emitting face 2b of the polarization separation element 2 with an adhesive (not shown), for example. Accordingly, the retardation plates 3 are disposed on the light emitting face 2b in a lattice shape. Here, the retardation plates 3 are formed on the regions through which the p-polarized light passes in the embodiment, but the retardation plates 3 may be formed only on regions through which the s-polarized light passes.

The retardation plates 3 have a function of converting the p-polarized light (linear polarized light) incident thereon after transmitting through the polarization separation film 22 into s-polarized light (linear polarized light). The p-polarized light incident on the retardation plates 3 is separated into an ordinary ray and an extraordinary ray having same amplitude each other inside the retardation plates 3, and travels in the retardation plates 3 at different retardation velocities so as to be converted into the s-polarized light having a vibration direction that is orthogonal to a vibration direction of an electric field vector of the incident p-polarized light.

As the adhesive forming the spacers 24, the adhesive bonding the retardation plates 3, and the adhesive bonding the polarization separation faces 21a of the glass materials 21 that are adjacent, a one-part epoxy-based or one-part acrylic-based ultraviolet curing adhesive that is easily handled in a bonding process and is resistant to a relatively high temperature is used. The ultraviolet curing adhesive is applied to a bonding part, and then hardened by being irradiated with light of a chemical lamp or a high pressure mercury lamp.

The air gap layers 23 serving as air layers of the polarization conversion element 1 structured as above will be concretely described and a movement of incident light incident on the polarization conversion element 1 will be described below.

Referring to FIG. 2, light (including s-polarized light and p-polarized light) incident on the light incident face 2a (of the glass material 21 of the polarization separation element 2) of the polarization conversion element 1 along a system optical axis AL is separated into two partial bundle of rays of s-polarized light and p-polarized light at the polarization separation film 22 formed on the polarization separation face 21a. Then the s-polarized light obtained by separating the incident light by the polarization separation film 22 is reflected by the reflection face 21b and the p-polarized light obtained by the separation transmits through the polarization separation film 22 so as to be converted into s-polarized light at the retardation plates 3. Namely, the light incident on the light incident face 2a is converted into a single type of polarized light, that is, s-polarized light so as to be emitted from the light emitting face 2b in a nearly parallel direction to the system optical axis AL.

The s-polarized light that is obtained by separating the incident light by the polarization separation film 22 and travels toward the reflection face 21b is incident on the reflection face 21b at approximately 45° with respect to the reflection face 21b so as to be reflected. The incident light incident on the reflection face 21b is totally reflected by the reflection face 21b due to the air gap layer 23 provided to the reflection face 21b. The reflected light that is totally reflected by the reflection face 21b travels toward the light emitting face 2b.

Here, the air gap layer 23 is formed such that an interval between the reflection faces 21b of the glass materials 21, which are adjacent at the inclined planes, in an orthogonal direction to the reflection faces 21b, that is, a height of the spacers 24 forming the air gap layer 23 is about 10 αm.

Since the polarization conversion element 1 includes the air gap layer 23 having this interval α, no evanescent light (near filed light) leaking to the air gap layer 23 from the reflection face 21b diffuses to the glass material 21 (light transmitting base material) that is adjacent to the air gap layer 23, being able to obtain a reflectance of 100% (total reflection). The permeation depth of the evanescent light (a height from the reflection face 21b) is less than 1 μm in a visible light wavelength range (about 400 nm to about 700 nm). Therefore, the interval α in the embodiment is preferably at least 1 μm or more. That is, if the interval α is less than 1 μm, the evanescent light diffuses to the glass material 21 that is adjacent. Thus, a desired reflectance can not be realized. An upper limit value of the interval α can be set in view of a pitch size on the light incident face 2a between the inclined planes of the plurality of glass materials 21 that are bonded each other. However, the upper limit value of the interval α may be about 100 μm.

As a wavelength of incident light on the reflection faces 21b is shortened, a refraction index increases because a refraction index of the glass materials 21 has wavelength dispersibility. That is, a critical angle also depends on a wavelength of incident light. Accordingly, a critical angle of incident light on the reflection face 21b can be confirmed (set) based on an approximate formula based on a refractive index dispersion formula (Hartman's dispersion formula) expressed in Formula 1, and a total reflection conditional formula expressed in Formula 2. Here, a refractive index of a base material in a description below is a refractive index on d line (wavelength of 587.56 nm).

$$Ns=(1.509+((112.24/(\lambda-250.48)^{1.6090}))$$ Formula 1

Here, λ indicates a wavelength (nm) of incident light, and Ns indicates a refractive index of the incident light having a wavelength λ.

$$\theta_c=\sin^{-1}(1/Ns)$$ Formula 2

Here, $\theta_c$ indicates a critical angle (°), and expresses an incident angle on the reflection face 21b (a narrow angle formed by a normal line of the reflection face 21b and incident light).

A maximum incident angle ø (°), at which an critical angle becomes $\theta_c$ (total reflection occurs), on the light incident face 2a of the polarization separation element 2 can be confirmed based on Formula 3 below.

$$ø=\sin^{-1}((Ns\times\sin(45°-\theta_c))$$ Formula 3

Here, Ns indicates a refractive index of incident light having a wavelength λ, and $\theta_c$ indicates a critical angle (°). In terms of the maximum incident angle ø in Formula 3, incident angle θ for the total reflection on PBS is expressed as 90°>θ≧-ø, in a case where an angle in a direction of light made orthogonally incident on the light incident face 2a of the polarization separation element 2 is 0°, that is, an angle of light being incident at 45° on the polarization separation face 21a (polarization separation film 22) is 0°, an angle smaller than 45° is minus (-), and an angle larger than 45° is plus (+).

Figure 3:
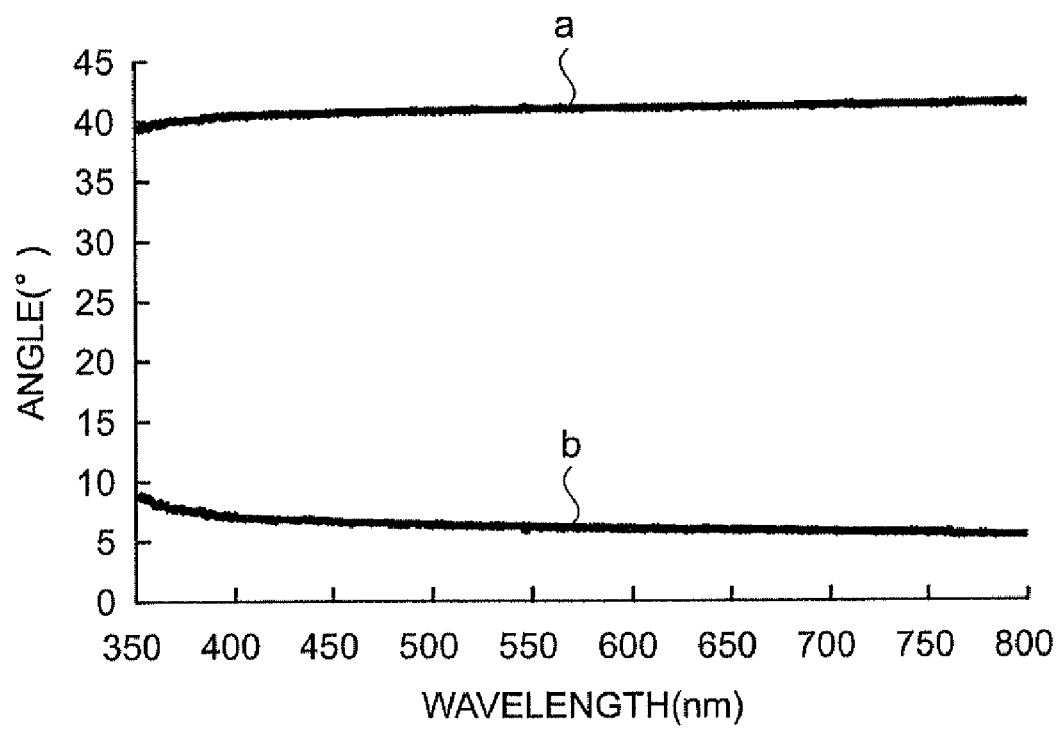
FIG. 3 is a graph showing wavelength dispersibility of a critical angle $\theta_c$ and wavelength dispersibility of a maximum incident angle $\varnothing$, in the polarization conversion element of the first embodiment.

FIG. 3 is a graph showing a wavelength dispersibility of the critical angle $\theta_c$ calculated based on Formula 1 and Formula 2 in the polarization conversion element of the first embodiment, and showing a wavelength dispersibility of the maximum incident angle ø calculated based on Formula 3. An abscissa axis of the graph indicates a wavelength (nm) of incident light in a wavelength range from 350 nm to 80 nm, and a longitudinal axis indicates an angle (°). A curve line a indicates wavelength dispersibility of the critical angle $\theta_c$, and a curve line b indicates wavelength dispersibility of the maximum incident angle (-ø). Each of the curve lines is a diagram formed by connecting plot points marked every 1 nm in the wavelength range from 350 nm to 800 nm.

Referring to FIG. 3, the critical angle $\theta_c$ expressed in the curve line a has little variation in a visible light range (from about 400 nm to 700 nm). The minimum value is 40.56° (actual measurement wavelength of 423 nm, theoretical wavelength of 400 nm), the maximum value is 41.18° (actual measurement wavelength of 675 nm, theoretical wavelength of 700 nm), and an average value is 40.92°.

On the other hand, the maximum incident angle (-ø) expressed in the curve line b is in a range from 5.81° (wavelength of 675 nm) to 6.83° (wavelength of 423 nm) in the visible light range.

Accordingly, in the polarization conversion element 1 including the polarization separation film 22 and the reflection face 21b, to which the air gap layer 23 is provided, at the inclined planes that are formed to have an angle of 45° with respect to the light incident face 2a and the light emitting face 2b, total reflection by the reflection face 21b can be achieved in a case where incident light of which the maximum incident angle (-ø) on the light incident face 2a is at least 5.81° or less.

A range, in which total reflection can be achieved at the reflection face 21b, of incident angle (angle with respect to the system optical axis AL) of incident light on the light incident face 2a is a range in which variations such as variations of inclination of sides of a parallelogram composed of the polarization separation face 21a and reflection face 21b of the glass material 21 can be handled.

A range, in which the total reflection occurs at the reflection face 21b formed to have an angle of 45° with respect to the light incident face 2a and the light emitting face 2b, of a refractive index Ns of a light transmitting base material (glass material 21) is expressed as 1.93>Ns≧1.415.

Examples of such light transmitting base material include FK5 (Ns: 1.48749), BK7 (Ns: 1.5168), SK10 (Ns: 1.62278), LAK10 (Ns: 1.72003), and SF66 (Ns: 1.92286).

Figure 4A:
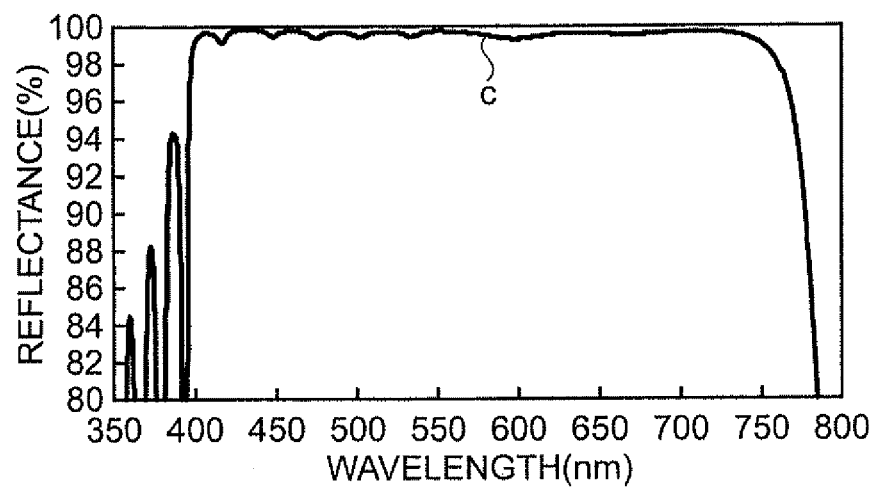
FIGS. 4A to 4C are graphs showing wavelength dispersibility of a reflectance in an incident angle range from −5° to +5° on a light incident face of a related art polarization conversion element.
Figure 4B:
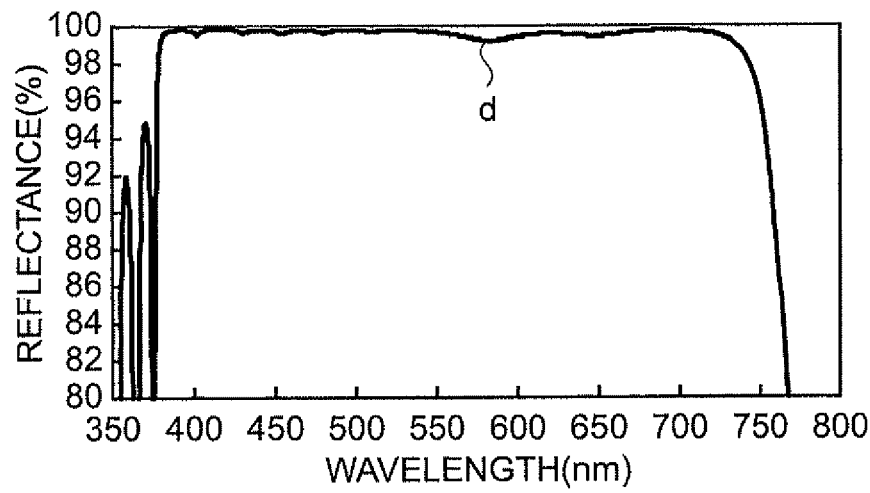
Figure 4C:
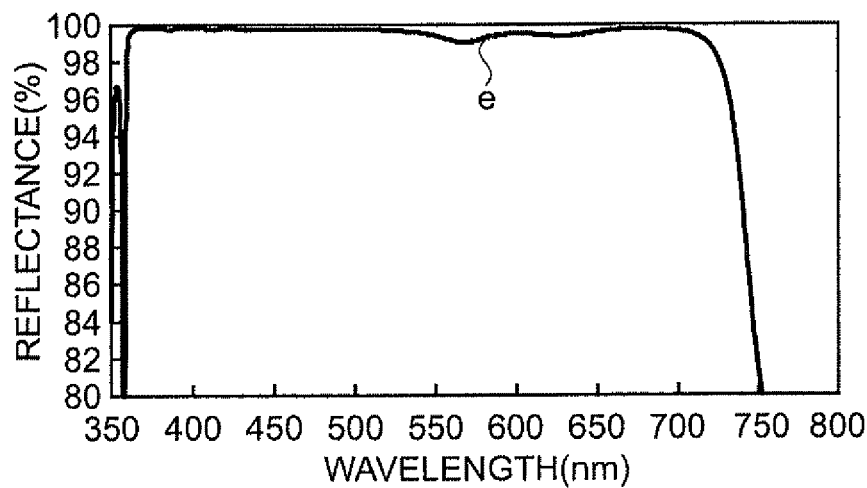
Figure 22A:
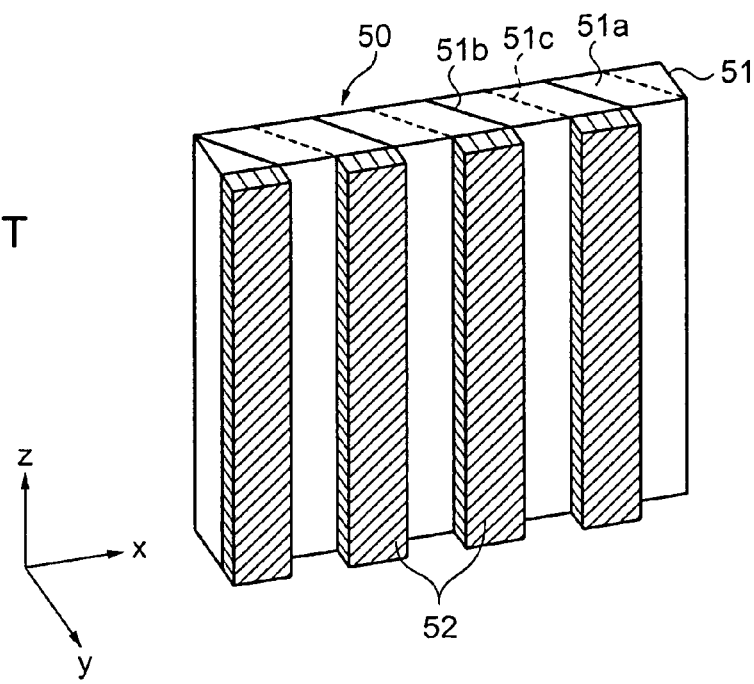
FIG. 22A is a perspective view showing a related art polarization conversion element.
Figure 22B:
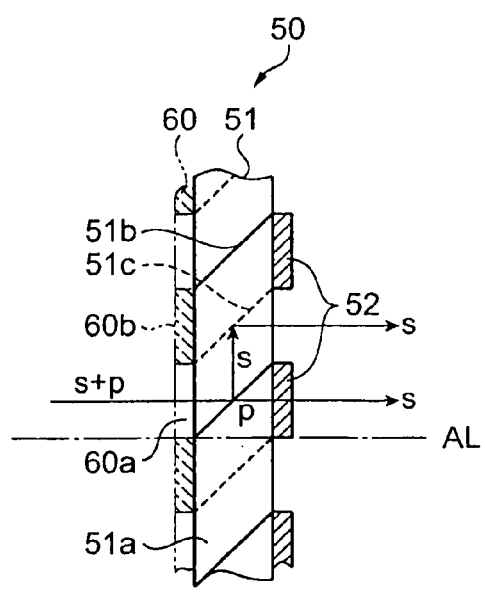
FIG. 22B is a plan view showing the related art polarization conversion element of FIG. 22A viewed from a +z axis direction.

On the other hand, FIGS. 4A to 4C show wavelength dispersibility of a related art common polarization conversion element 50 (refer to FIGS. 22A and 22B) in which polarization separation films 51b and reflection films 51c are formed alternately on a plurality of inclined planes. Here, Table 1 shows film a structure of the reflection films 51c formed on the inclined planes of the polarization conversion element 50. The film structure shown in Table 1 is a design value in case of a design wavelength of 600 nm, and Table 1 shows a material and an optical film thickness (nd) on each layer number of a multilayer film. The layer number is sequentially given as No. 1, No. 2, No. 3, and, ..., from a layer positioned on a surface of the glass material 51a.

TABLE 1

| LAYER NO. | OPTICAL FILM THICKNESS | MATERIAL |
| --- | --- | --- |
| 1 | 0.250 | L |
| 2 | 0.249 | H |
| 3 | 0.483 | L |
| 4 | 0.270 | H |
| 5 | 0.385 | L |
| 6 | 0.325 | H |
| 7 | 0.359 | L |
| 8 | 0.311 | H |
| 9 | 0.400 | L |
| 10 | 0.253 | H |
| 11 | 0.422 | L |
| 12 | 0.294 | H |
| 13 | 0.326 | L |
| 14 | 0.246 | H |
| 15 | 0.450 | L |
| 16 | 0.260 | H |
| 17 | 0.318 | L |
| 18 | 0.203 | H |
| 19 | 0.291 | L |
| 20 | 0.185 | H |

TABLE 1-continued

| LAYER NO. | OPTICAL FILM THICKNESS | MATERIAL |
|---|---|---|
| 21 | 0.309 | L |
| 22 | 0.201 | H |
| 23 | 0.310 | L |
| 24 | 0.188 | H |
| 25 | 0.294 | L |
| 26 | 0.157 | H |
| 27 | 0.285 | L |
| 28 | 0.163 | H |
| 29 | 0.338 | L |
| 30 | 0.032 | H |
| 31 | 0.250 | L |

Referring to Table 1, the reflection film 51c is a dielectric multilayer film composed of 31 layers. The 31 layers are layered such that a low refractive index layer (denoted by L at a material section in Table 1) made of $SiO_2$ as a first layer and a high refractive index layer (denoted by H at the material section in Table 1) made of $Ta_2O_5$ as a second layer are sequentially layered, and thus $SiO_2$ layers and $Ta_2O_5$ layers are alternately layered from a third layer to a $31^{st}$ layer in sequence.

FIGS. 4A to 4C are graphs showing wavelength dispersibility of a reflectance of the reflection film 51c having an incident angle range from −5° to +5° on a light incident face of the related art polarization conversion element. FIG. 4A shows a case of an incident angle of −5°, FIG. 4B shows a case of an incident angle of 0°, and FIG. 4C shows a case of an incident angle of +5°.

An abscissa axis of the graphs indicates a wavelength (nm) of incident light in a wavelength range from 350 nm to 800 nm, and a longitudinal axis indicates a reflectance (%). Each of curve lines c, d, and e is a diagram formed by connecting plot points marked every 1 nm in the wavelength range from 350 nm to 800 nm.

Referring to FIGS. 4A to 4C, a reflectance at the reflection face 21b is low in a low wavelength range and a high wavelength range that are out of the visible light wavelength range in each of the cases of the incident angle of −5° (curve line c), the incident angle of 0° (curve line d), and the incident angle of +5° (curve line e). The low reflectance range shifts toward a high wavelength side as the incident angle shifts from +5° to −5°. All of the curve lines show reflectances, in the cases of incident angles from +5° to −5° including incident angle of 0° in the visible light wavelength range, of high values of 99.0% or more, but all of the curve lines have concavo-convex shape thereon indicating reflection loss. This loss occurs because the polarized light is absorbed by the reflection film 51c composed of the dielectric multilayer film.

A method for manufacturing the polarization separation element 2 structured as above will now be described, FIGS. 5A to 6B are sectional views showing a main process for manufacturing the polarization separation element according to the first embodiment. Here, these figures show each element having a different size or proportion from the real one for the convenience of the description below.

Figure 5A:
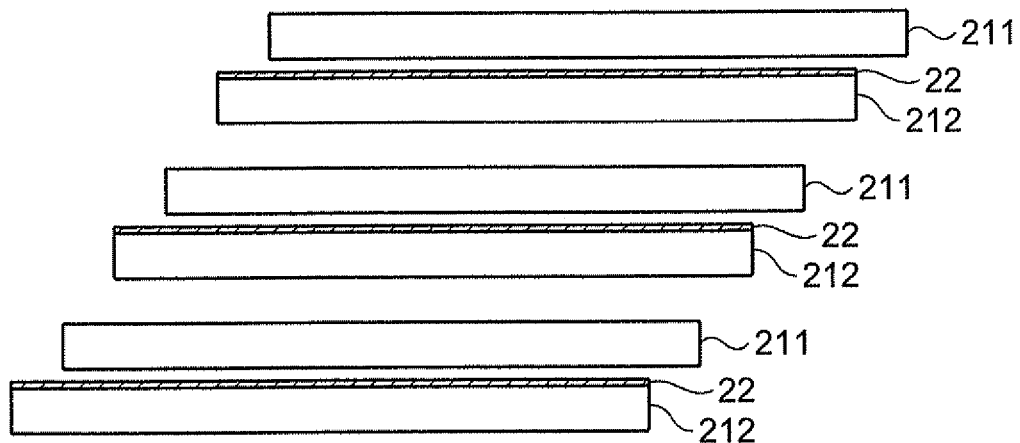
FIGS. 5A and 5B are sectional views showing a main process for manufacturing a polarization separation element according to the first embodiment.

In a step shown in FIG. 5A, a plurality of glass plates 211 as light transmitting base materials and a plurality of glass plates 212 as light transmitting base materials are prepared (preparing step). These glass plates 211 and the glass plates 212 are made of white sheet glass and respectively have rectangular shapes and predetermined thicknesses. A columnar shape glass material 21 of which a cross-sectional shape is an approximate parallelogram will be formed by the glass plates 211 and 212 later.

On one face of two faces of each of the glass plates 212, the polarization separation film 22 is formed in advance. The polarization separation film 22 is, for example, is formed such that an intermediate refractive index layer made of $SiO_2$, a low refractive index layer made of $MgF_2$, and a high refractive index layer made of a mixture containing $La_2O_3$ and $Al_2O_3$ in a weight ratio of 1:3 are layered in a predetermined order and in a predetermined optical film thickness.

In figures hereinafter including FIGS. 6A and 6B, the glass plates as the light transmitting base materials are simplified to be shown in different number from the real number.

Figure 5B:
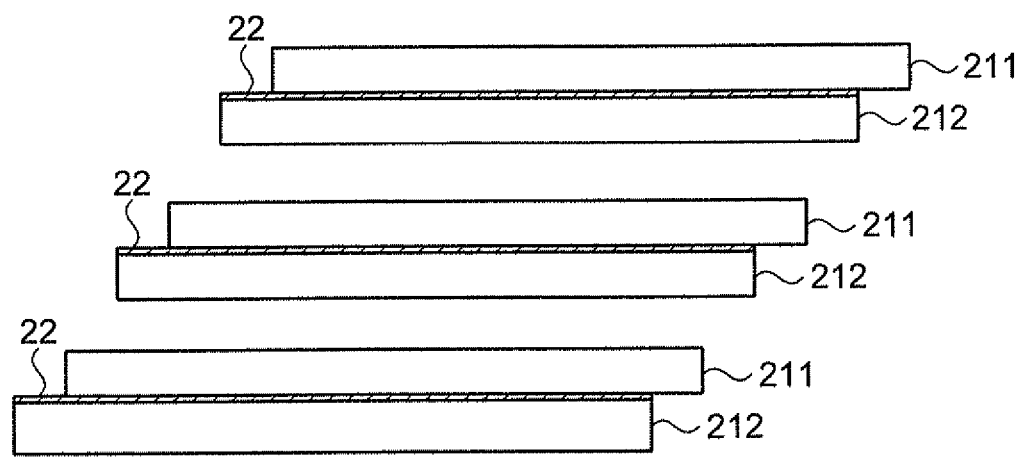

In a step shown in FIG. 5B, a face provided with the polarization separation film 22 of each of the glass plates 212 and one face of each of the glass plates 211 are bonded to each other with an ultraviolet curing adhesive which is not shown (glass block forming step). Accordingly, each of the glass plates 211 and each of the glass plates 212 form one glass block, and the polarization separation film 22 is interposed in an interface of the glass plate 211 and the glass plate 212.

Figure 6A:
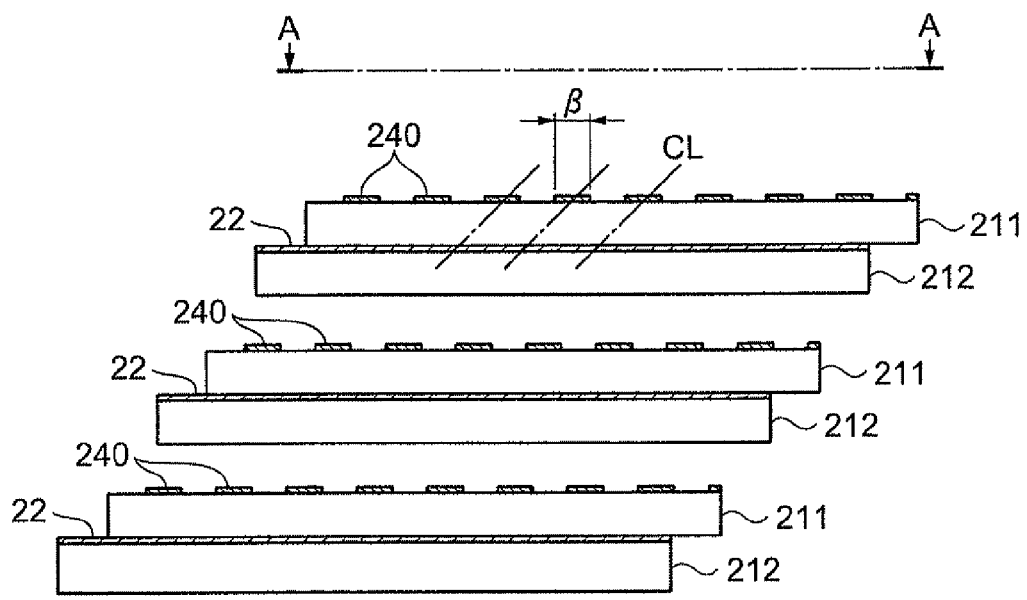
FIGS. 6A and 6B are sectional views showing a main process for manufacturing the polarization separation element according to the first embodiment.

In a step shown in FIG. 6A, an uneven processing is performed on a surface of the glass plate 211 of the glass block. As the uneven processing, adhesive 240 is applied in a lattice (adhesive applying step). As the adhesive 240, a one-part epoxy-based or one-part acrylic-based ultraviolet curing adhesive, for example, is used.

Figure 6B:
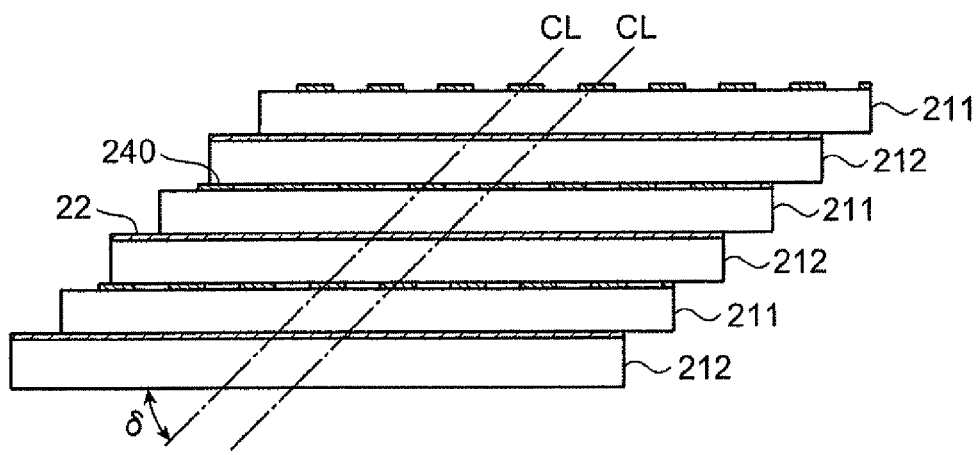
Figure 7:
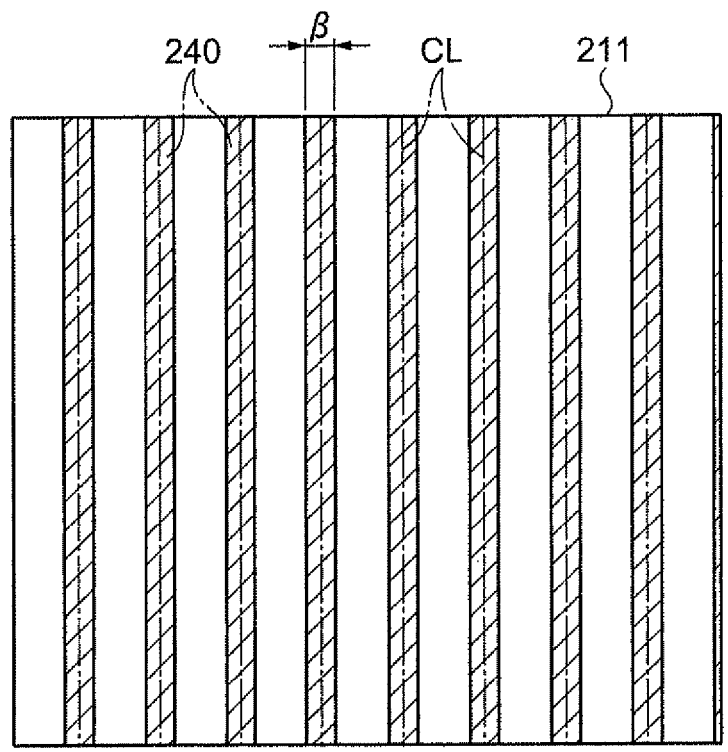
FIG. 7 is a fragmentary view showing a glass block of the polarization separation element according to the first embodiment taken in the direction of arrows of A-A of FIG. 6A.

FIG. 7 is a fragmentary view showing one glass block taken in the direction of arrows of A-A of FIG. 6A. Referring to FIGS. 6A and 7, the adhesive (adhesive layer) 240 applied to the surface of the glass plate 211 is formed along one side of a rectangular outer shape of the glass plate 211 in a manner being positioned across cutting lines CL as center lines along which the plate 211 is to be cut in a step shown in FIG. 6B described later. A width β of the adhesive layer 240 is set in view of adhesiveness in a bonding process of the glass blocks described later, but the width β is preferably set to be as small as possible. Accordingly, the adhesive layer 240 is formed on the surface of the glass plate 211 along the cutting lines CL in a lattice shape. Here, the thickness of the adhesive 240 after it is applied and hardened is about 10 μm.

In a step shown in FIG. 6B, after a plurality of glass blocks respectively including the glass plates 211 having a surface on which the adhesive 240 is applied are bonded to each other, the bonded body is cut along the cutting lines CL (glass block bonding and cutting step).

The glass block bonding is conducted such that a face, on which the adhesive 240 is applied, of the glass plate 211 of each of the glass blocks and a face of the glass plate 212 of each of the glass blocks are bonded in a manner positioning the center lines of the adhesive 240, which is applied to the surface of the glass plate 211 of the glass blocks in a lattice shape, on the cutting lines CL. Then the adhesive 240 is hardened by irradiating with light (ultraviolet ray) of a chemical lamp or a high pressure mercury lamp.

The plurality of glass blocks bonded to each other are cut nearly parallel at positions of the cutting lines CL (denoted by a dashed-dotted line) having a predetermined angle δ with respect to the surface of the blocks so as to cut out element blocks. A value of the angle δ is approximately 45°. One cutting face of each of the element blocks cut out at the cutting lines CL corresponds to the light incident face 2a of the polarization separation element 2 and the other cutting face corresponds to the light emitting face 2b (refer to FIGS. 1 and 2).

Both end parts of each of the element blocks that are obtained are shaped to have a predetermined shape, completing the polarization separation element 2. Thereafter, the retardation plates 3 are bonded on only regions, through which the p-polarized light transmitting the polarization separation film 22 passes, of the light emitting face 2b of the polarization separation element 2 that is completed, completing the polarization conversion element 1.

Figure 8:
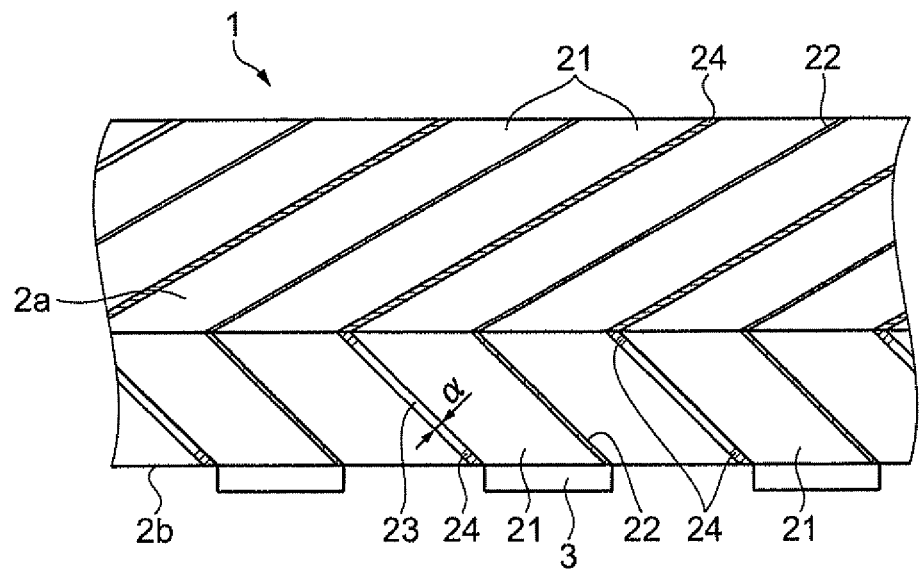
FIG. 8 is a perspective view showing a part of the polarization conversion element according to the first embodiment.

FIG. 8 is a perspective view showing a part of the polarization element 1 that is completed.

Referring to FIG. 8, in the polarization conversion element 1 that is completed, the adhesive 240 applied in the lattice shape in the step shown in FIG. 6A functions as the spacers 24 as the step forming means formed along the light incident face 2a and the light emitting face 2b of the glass materials 21 that are adjacent. Further, in the element 1, the air gap layers 23 composed of air having an interval $\alpha$ of about 10 µm are formed. The air gap layers 23 formed in the polarization separation element 2 are exposed at both end faces in an extending direction of the glass materials 21 having a columnar shape. That is, the air gap layers 23 are formed to be opened to the both end faces.

Thus, in the polarization conversion element 1, the polarization separation films 22 and the air gap layers 23 are alternately formed on a plurality of inclined planes forming an angle of approximately 45° with respect to the light incident face 2a and the light emitting face 2b. The polarization conversion element 1 can be preferably used as an optical element, by which incident light (including s-polarized light and p-polarized light) is converted into s-polarized light that is a single type of polarized light and the s-polarized light is emitted, in an illumination optical system such as a liquid crystal projector.

As described above, in the polarization separation element 2 including the plurality of glass materials 21, the polarization separation films 22 that separate incident light into two types of polarized light and the air gap layers 23 are alternately formed on the plurality of inclined planes. In the element 2, the glass materials 21 are sequentially bonded at the plurality of inclined planes forming approximately 45° with respect to the light incident face 2a and the light emitting face 2b being nearly parallel to the light incident face 2a. Accordingly, the polarization separation element 2 and the polarization conversion element 1 that decrease manufacturing cost and shorten manufacturing lead time more than a related art reflection film, which reflects one polarized light obtained by separation by the polarization separation film 22, can be obtained. Further, reflection that is close to 100% (total reflection) can be achieved compared to a reflection film composed of a dielectric multilayer film that absorbs a part of incident light, being able to obtain the polarization separation element 2 and the polarization conversion element 1 having excellent reflective performance (polarization conversion performance).

Furthermore, the spacers 24 as the step forming means are disposed at the both end parts, which are at the light incident face 2a and the light emitting face 2b of the glass materials 21 adjacent each other, of the inclined planes. Therefore, the air gap layers 23 as air layers are easily formed on the inclined planes of the glass materials 21 and thus one type of polarization light that is obtained by separation by the polarization separation film 22 to be incident on the inclined planes provided with the air gap layers 23 can be totally reflected.

The spacers 24 as the step forming means are made by the adhesive 240 that bonds the glass materials 2 adjacent each other along the inclined planes. Thus the manufacturing process does not become complex and the number of steps does not increase.

The interval $\alpha$ of the air gap layer 23 is at least 1 µm or more with respect to incident light in the visible light wavelength range (about 400 nm to about 700 nm), so that evanescent light leaking at the inclined plane of one glass material 21 does not diffuse to another glass material 21 that is adjacent, being able to totally reflect the polarized light being incident. Accordingly, the polarization separation element 2 and the polarization conversion element 1 having excellent reflection performance can be obtained. Furthermore, the refractive index of the glass material 21 is equal or grater than 1.45 and less than 1.65, being able to totally reflect one polarized light obtained by separating light at the polarization separation film 22 and being incident to the inclined planes of the glass materials 21 provided with the air gap layers 23. Accordingly, the polarization separation element 2 and the polarization conversion element 1 having excellent reflection performance can be obtained.

Here, the following modifications can provide the same advantageous effect as the first embodiment.

[First Modification]

The first embodiment describes the spacers 24 as the step forming means forming the air gap layers 23 are made of the adhesive 240 bonding and fixing the glass materials 21 that are adjacent by the uneven processing. However, the spacers 24 as the step forming means may be structured and manufactured as follows. In a method for manufacturing a polarization separation element according to this first modification, an uneven processing (groove processing) based on an etching method is conducted with respect to one face of a glass plate having a rectangular planar shape and thus concave portions opened in an up and down direction of the rectangular planar shape are formed so as to obtain convex portions along the concave portions.

A structure of the spacers 24 will be described below based on a method for manufacturing the polarization separation element 2. In the following description, the manufacturing method other than the structure (forming method) of the spacers 24 is same as that in the first embodiment, so that the description thereof will be omitted or simplified.

Figure 9:
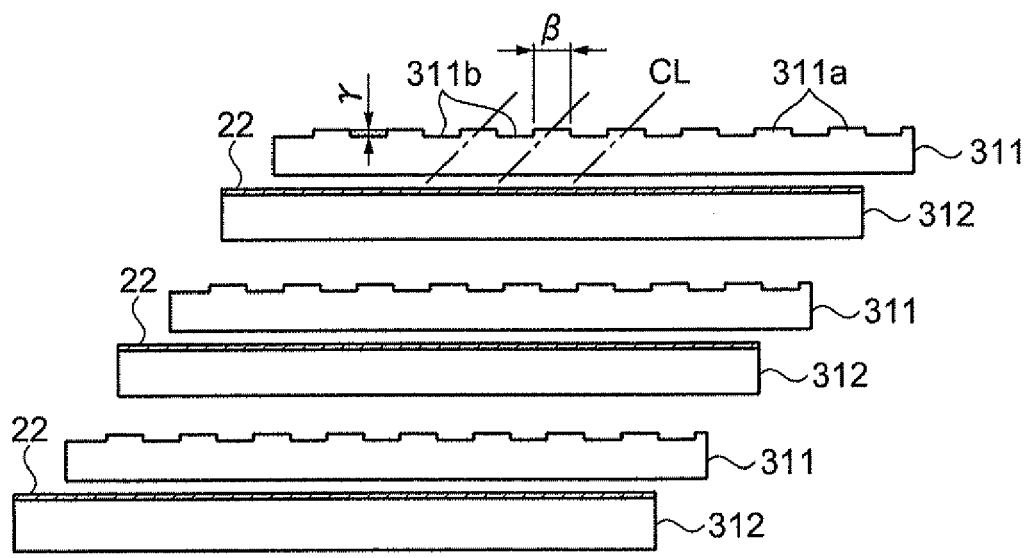
FIG. 9 is a sectional view showing a preparing step in a process for manufacturing a polarization separation element according to a first modification.

FIG. 9 is a sectional view showing a preparing step in a process for manufacturing a polarization separation element according to the first modification. Referring to FIG. 9, a plurality of glass plates 311 as light transmitting base materials and a plurality of glass plates 312 as light transmitting base materials are prepared. These glass plates 311 and the glass plates 312 are made of white sheet glass having a rectangular shape and a predetermined thickness. The glass plates 311 and 312 form a columnar shape glass material 21 of which a cross-sectional shape is a parallelogram later.

The convex portions 311a are formed on one face of two faces of each of the glass plates 311 in advance by etching. The convex portions 311a are formed along one side of the rectangular outer shape of the glass plate 311 in a lattice shape (Refer to FIG. 7 for a planar shape. The convex portions 311a correspond to the adhesive layers 240 in FIG. 7). The convex portions 311a function as the spacers 24 as the step forming means forming the air gap layers 23 (refer to FIGS. 1 and 2). On one face of two faces of each of the glass plates 312, the polarization separation film 22 is formed.

The convex portions 311a are formed in the lattice shape to have a width $\beta$ across respective cutting lines CL, intersecting the surface of the glass plate 311, as their center lines along which the plate 311 is to be cut in a later step. The width $\beta$ of the convex portions 311a is set in view of adhesiveness in a bonding step of the glass blocks described later, but the width $\beta$ is preferably set to be as small as possible.

In a method for forming the convex portions 311a in the lattice shape, after a resist is applied to regions, to which the convex portions 311a are to be formed, of a surface of the glass plate 311, the following steps: pre-baking for drying the resist, exposure employing a photo mask, developing by a developer, and post-baking for enhancing adhesiveness of the resist are performed, forming a resist layer in a lattice shape. Here, for forming the resist layer having the lattice shape, a photosensitive dry film may be used.

Then etching is conducted by using the resist layer that is patterned as a positive type etching resist. The etching is conducted based on a dry etching method such as a reactive ion etching (RIE) or a wet etching method for soaking in an etchant of ammonium fluoride ($H_4FN$) or the like.

Then the resist is removed by a photoresist stripper such as acetone. Thus the concave portions 311b opened in an up and down direction of the rectangular planar shape are formed in the lattice shape. That is, the convex portions 311a along respective concave portions 311b are formed by the uneven processing for forming the concave portions 311b (Refer to FIG. 7 for the planar shape. The convex portions 311a correspond to the adhesive layer 240 in FIG. 7). A depth γ of the concave portions 311b that are formed (a height of the convex portions 311a) is about 2 μm. The depth γ of the concave portions 311b is preferably at least 1 μm or more.

It is preferable that a water-repellent treatment be conducted on the surface of the glass plate 311 provided with the convex portions 311a. In the water-repellent treatment, a water-repellent coat composed of a water-repellent functional film giving water repellency is formed at least on the face, on which the convex portions 311a are formed, of the glass plate 311.

For forming the water-repellent coat, a fluorine containing silane compound expressed in Formula 4, for example, is used.

Formula 4

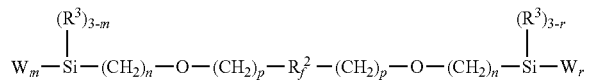

Here, in Formula 4, $R_f^2$ includes a unit expressed by a unit formula of "—$(C_kF_{2k})O$—", and expresses a bivalent group having a linear perfluoro polyalkylene ether structure including no branches. In the unit formula "—$(C_kF_{2k})O$—", k denotes an integer number from 1 to 6. $R^3$ denotes a 1-8C monovalent hydrocarbon group, W denotes a hydrolyzable group or a halogen atom, p denotes 0, 1, or 2, n denotes an integer number from 1 to 5, and m and r denote 2 or 3.

The water-repellent coat is formed by vacuum deposition, for example, that is a dry processing.

An evaporation source including a fluorine containing silane compound is placed in a vacuum chamber of a vacuum deposition device, and the glass plate 311 is fixed in a support device in a manner allowing its surface provided with the convex portions 311a to face the evaporation source so as to conduct the vacuum deposition.

The evaporation source that is used is prepared such that the fluorine containing silane compound expressed in Formula 4 is diluted with fluorinated solvent to have predetermined concentration, and a pellet made of porous ceramics is impregnated with a predetermined amount of the resulting solution.

After the inside of the vacuum chamber is decompressed to have a predetermined pressure, the evaporation source is heated to be 600 degrees Celsius by a heater so as to evaporate the fluorine containing silane compound. Thus a water-repellent functional film made of the fluorine containing silane compound is formed on the surface facing the evaporation source and provided with the convex portions 311a. Then, after the glass plate 311 on which the deposition is conducted is taken out from the vacuum chamber, the plate 311 undergoes an annealing treatment in which the plate 311 is put in a thermo-hygrostat oven adjusted to have a predetermined temperature and a predetermined humidity for a predetermined period of time, forming the water-repellent coat.

The film thickness of the water-repellent functional film is not limited, but the thickness is preferably set to be as thin as possible to an extent that water repellency can be secured. The film thickness is about 0.001 μm to about 0.01 μm.

The water-repellent coat may be made of an organic silazane compound expressed by Formula 5 instead of the fluorine containing silane compound expressed by Formula 4.

 Formula 5

Here, p in Formula 5 denotes a positive integer.

Specific examples of the organic silazane compound include hexamethyldisilazane.

Alternatively, the water-repellent coat may be formed by a wet processing. For example, after a water-repellent processing liquid is applied to the surface, on which the convex portions 311a are formed, of the glass plate 311 by spin-coating, spraying, dipping, or the like, the annealing treatment is conducted, being able to form the water-repellent coat. The water-repellent processing liquid is obtained by dissolving the fluorine containing silane compound with an organic solvent and adjusting to a predetermined concentration. The organic silazane compound can be formed in a similar way. It is preferable that the water-repellent coat composed of the water-repellent functional film providing water repellency be formed on a surface of the glass plate 211 before the glass plate 211 undergoes the uneven processing, in which at least the adhesive 240 is applied in a lattice shape, in advance in a similar way, in the first embodiment.

Thus, the water-repellent coat is formed on the surface, on which the convex portions 311a are formed, of the glass plate 311. Therefore, even though the air gap layers 23 formed in the polarization separation element 2 are exposed at both end faces in an extending direction of the glass material 21 having a columnar shape, humidity (moisture) under an use environment can be prevented from permeating the air gap layer 23 by capillary phenomenon or attaching the air gap layer 23. Consequently, reflection performance (polarization conversion performance) can be prevented from deteriorating. If moisture attaches the air gap layers 23, a total reflection function is deteriorated, degrading the reflection performance.

One face, on which no concave portions 311b are formed in the lattice shape, of the glass plate 311 and a face, on which the polarization separation film 22 is formed, of the glass plate 312 are bonded to each other with an adhesive (not shown), thus forming one glass block by each of the glass plates 311 and each of the glass plates 312. The polarization separation film 22 is interposed between the glass plate 311 and the glass plate 312. Here, the thickness of the adhesive after it is applied and hardened is about 8 μm, for example.

After a plurality of glass blocks are bonded to each other, the bonded body is cut along the cutting lines CL (refer to FIGS. 6A and 6B).

The glass block bonding is conducted such that a face of the glass plate 311 of each of the glass blocks and a face of the glass plate 312 of each of the glass blocks are bonded in a manner positioning the center lines of the convex portions 311a, formed on the surface of the glass plate 311 in the lattice shape, on the cutting lines CL. The bonding can be conducted by using an adhesive such as an ultraviolet curing adhesive, but may be conducted by a direct bonding method applying silane coupling agent and/or irradiating with an active energy ray.

Then the plurality of glass blocks that are bonded to each other are cut nearly parallel at the cutting lines CL forming an angle of approximately 45° with respect to a surface so as to cut out element blocks. One cutting face of the element block cut out at the cutting lines CL corresponds to the light incident face 2a of the polarization separation element 2 and the other cutting face corresponds to the light emitting face 2b.

Both end faces of the element block that is obtained are shaped to have a predetermined shape, completing the polarization separation element 2. Thereafter, the retardation plates 3 are bonded on only regions, through which the p-polarized light transmitting the polarization separation film 22 passes, of the light emitting face 2b of the polarization separation element 2 that is completed, completing the polarization conversion element 10.

Figure 10:
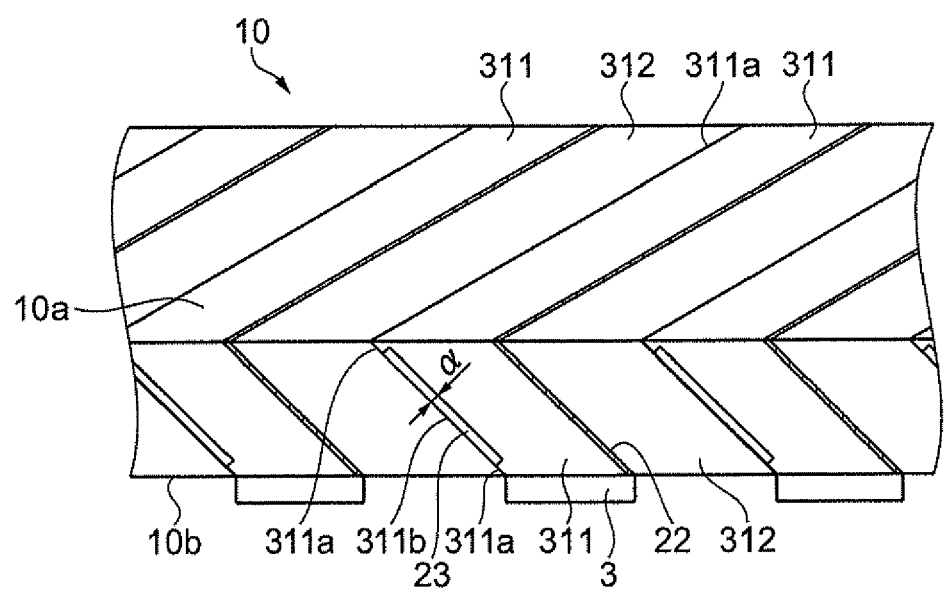
FIG. 10 is a perspective view showing a part of the polarization separation element according to the first modification.

FIG. 10 is a perspective view showing a part of the polarization conversion element 10 that is completed. In a description referring to FIG. 10, in order to make a structure of the polarization conversion element 10 that is completed recognizable, names and reference numbers of glass plates that are used are given to glass materials. Descriptions referring to partial perspective views hereafter (FIGS. 12, 14, and 19) of a polarization conversion element show glass materials in a similar way.

Referring to FIG. 10, in the polarization conversion element 10 that is completed, the convex portions 311a formed by the uneven processing based on the etching method function as the spacers 24 positioned at parts, which are at the light incident face 2a and the light emitting face 2b, of the inclined planes of the glass materials 21 that are adjacent, forming the air gap layers 23 composed of air and having the interval α of 10 μm (a depth γ of the concave portions 311b of 2 μm and a thickness of the adhesive after hardened of 8 μm). That is, the polarization separation films 22 and the air gap layers 23 as air layers are alternately formed on a plurality of inclined planes forming an angle of approximately 45° with respect to a light incident face 10a and a light emitting face 10b.

Thus, in the polarization conversion element 10 that is manufactured as above, the spacers 24 as the step forming means forming the air gap layers 23 are formed, that is, the convex portions 311a are formed by the uneven processing in which the concave portions 311b are formed by etching on the reflection face 21b of the glass material 21, providing an accurate and stable interval α (thickness of the spacers 24) of the air gap layers 23. Accordingly, air layers can be formed at a plurality of inclined planes of the glass materials 21 adjacent each other in high degree of parallelization, providing the polarization conversion element 10 having reflection performance (polarization conversion performance) in which an optical axis is stabilized.

[Second Modification]

The first modification forms the convex portions 311a by the uneven processing (groove processing) based on the etching method, but the convex portions 311a may be formed by microblasting method instead of the etching method. A manufacturing method is same as that in the first modification except for uneven processing for forming the convex portions 311a, so that only the uneven processing will be described with reference to FIGS. 9, 10 and 7.

The convex portions 311a are formed on one face of two faces of each of the glass plates 311 in advance by uneven processing based on the microblasting method. The convex portions 311a are formed along one side of the rectangular planar shape of the glass plate 311 in a lattice shape to be opened in an up and down direction (Refer to FIG. 7 for a planar shape. The convex portions 311a correspond to the adhesive layer 240 in FIG. 7). The convex portions 311a function as the spacers 24 as the step forming means forming the air gap layers 23. On one face of two faces of each of the glass plates 312, the polarization separation film 22 is formed.

In the uneven processing employing the microblasting method, after a mask for regions, to which the convex portions 311a are to be formed, of a surface of the glass plate 311 is formed in a masking step, the concave portions 311b are formed in a lattice shape by blasting processing.

In the masking step, a photosensitive dry film is first laminated on the surface of the glass plate 311. Then a mask that is formed in advance is layered on an upper surface of the photosensitive dry film so as to expose the photosensitive film to light. The mask is formed for removing a region other than a region where the convex portions 311a are to be formed, that is, for removing a region where the concave portions 311b are to be formed. The exposure is conducted such that the photosensitive dry film on the glass plate 311 is irradiated with ultraviolet rays through the mask by an exposure device.

Then, development is conducted. The development is conducted such that the glass plate 311 provided with the photosensitive dry film that is exposed to light is put in a development device and a developer is sprayed from a spray nozzle to the photosensitive dry film. As the developer, sodium carbonate aqueous solution having a concentration of about 0.1% to about 0.3% and a temperature of about 30 degrees Celsius is used. Accordingly, a plurality of photosensitive dry films having similar shapes as those of the convex portions 311a to be formed are remained in a lattice shape on the surface of the glass plate 311.

After the plate 311 is rinsed by an acid aqueous solution and dried, the process goes to the blasting step.

In the blasting step, the glass plate 311 provided with the photosensitive dry films that are developed is processed by blasting with a microblasting device.

In the blasting processing, the microblasting device moves the glass plate 311 at a moving velocity of about 50 mm/sec. while jetting compressed air of injection pressure of 0.15 MPa together with an abrasive from a blast nozzle to the surface of the glass plate 311 provided with the photosensitive dry films after the development. Thus regions, other than regions covered by the photosensitive dry films that are remained, of the glass plate 311 are removed. Here, it is preferable that an end of the blast nozzle that jets the abrasive be positioned between the photosensitive dry films that are remained on the surface in the lattice shape and be moved along the photosensitive dry films.

Accordingly, the concave portions 311b are formed on the surface of the glass plate 311 in a lattice shape due to brittle fracture principle. That is, the convex portions 311a along respective concave portions 311b are formed by the uneven processing for forming the concave portions 311b. A depth γ of the concave portions 311b that are formed (a height of the convex portions 311a) is about 6 μm. The depth γ of the concave portions 311b is preferably at least 1 μm or more. The depth γ of the concave portions 311b that are formed can be adjusted by controlling the injection pressure in jetting the abrasive and/or the moving velocity. For example, concave portions 311b having a depth γ of about 18 μm can be obtained under conditions of the injection pressure of 0.35 MPa and the moving velocity of about 50 mm/sec.

Examples of the abrasive include silicon carbide, alumina, glass bead, and stainless powder. A particle size of the abrasive can be arbitrarily selected in view of the depth γ of the concave portions 311b to be formed. However, it is preferable that fine powders of about #3000 to #8000 (particle diameter from 4 μm to 1.2 μm) defined in JIS1998 be used so as to obtain the concave portions 311b having a depth γ of about 6 μm.

It is preferable that a water-repellent treatment similar to the treatment described in the first modification be conducted on the surface of the glass plate 311 on which the concave portions 311b and the convex portions 311a are formed by the uneven processing. Even though the air gap layers 23 are exposed at the both end faces in the extending direction of the glass material 21 having a columnar shape, this water-repellent treatment can prevent humidity (moisture) under the use environment from permeating the air gap layers 23 by capillary phenomenon or attaching the air gap layers 23. Consequently, reflection performance (polarization conversion performance) can be prevented from deteriorating.

After that, a face, on which the polarization separation film 22 is provided, of each of the glass plates 312 and a face, on which the uneven processing is not conducted, of each of the glass plates 311 are bonded to each other with an adhesive applied such that the adhesive is to be 4 μm-thick after curing so as to form a glass block.

Then after a plurality of glass blocks are bonded to each other, the bonded body is cut along the cutting lines CL so as to obtain an element block. Both end faces of the element block that is obtained are shaped to have a predetermined shape, providing the polarization separation element 2. Thereafter, the retardation plates 3 are bonded on only regions, through which the p-polarized light transmitting the polarization separation film 22 passes, of the light emitting face 2b of the polarization separation element 2 that is obtained, completing the polarization conversion element 10.

In the polarization conversion element 10 that is completed, the convex portions 311a formed by the uneven processing employing the microblasting method function as the spacers 24 positioned at parts, which are at the light incident face 2a and the light emitting face 2b, of the inclined planes of the glass materials 21 that are adjacent each other, forming the air gap layers 23 composed of air and having the interval α of about 10 μm. That is, the polarization separation films 22 and the air gap layers 23 as air layers are alternately formed on a plurality of inclined planes forming an angle of approximately 45° with respect to a light incident face 10a and a light emitting face 10b.

The polarization conversion element 10 manufactured by the uneven processing employing the misroblasting method can obtain a highly-accurate and stable interval α of the air gap layers 23. Accordingly, a high degree of parallelization can be provided to air layers formed at a plurality of inclined planes of the glass materials 21 adjacent each other, providing the polarization conversion element 10 having reflection performance (polarization conversion performance) in which an optical axis is stabilized. Further, bottom surfaces and side walls of the concave portions 311b forming the air gap layers 23 have a grained face due to the uneven processing based on the microblasting method so as to block stray light transmitting through the air layers by dispersion, providing more stable reflection performance (polarization conversion performance).

[Third Modification]

In the uneven processing (groove processing) based on the etching method described in the first modification and in the uneven processing based on the microblasting method described in the second modification, an uneven shape shown below may be formed so as to structure the air gap layers 23 on the surface of the glass plate 312.

Figure 11A:
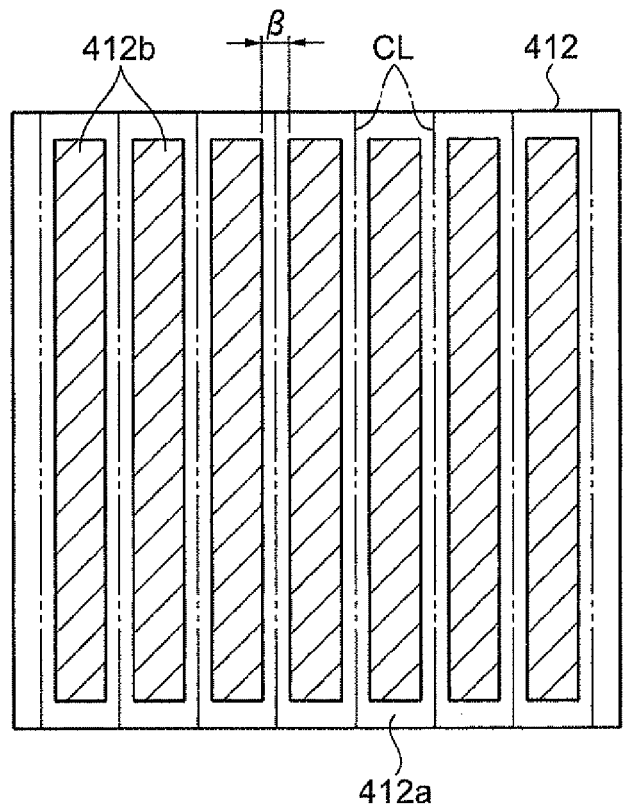
FIG. 11A is a plan view showing a surface, on which another uneven shape is formed, of a glass plate.
Figure 11B:
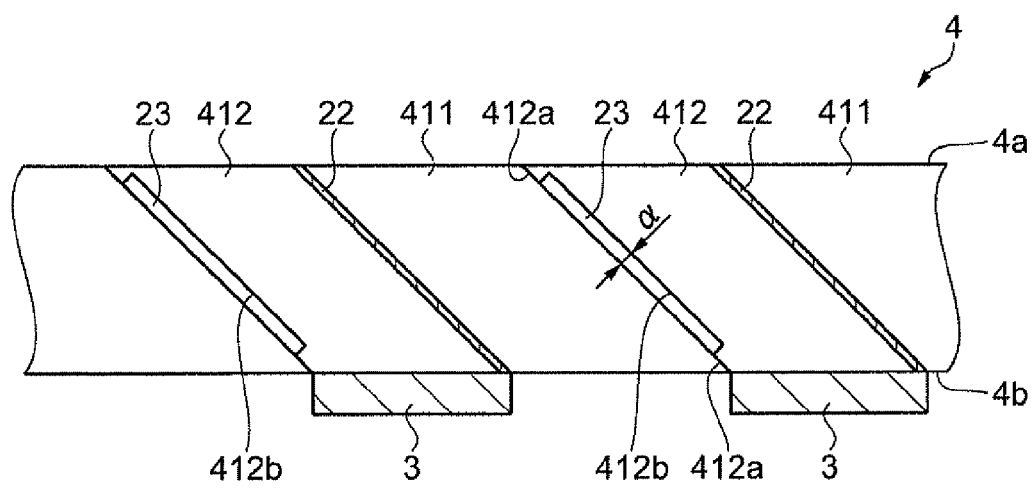
FIG. 11B is an enlarged sectional view showing a part of a polarization conversion element manufactured by using the glass plate shown in FIG. 11A.
Figure 13A:
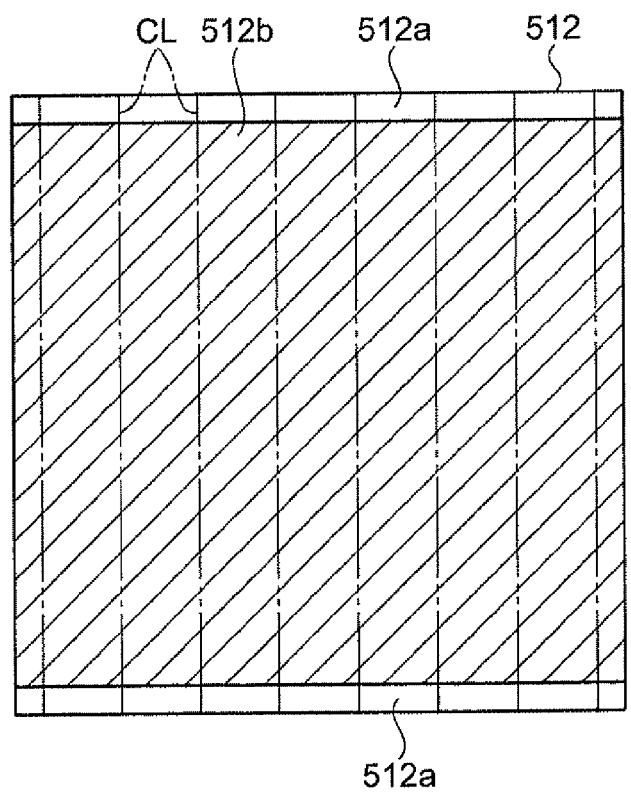
FIG. 13A is a plan view showing a surface, on which yet another uneven shape is formed, of a glass plate.
Figure 13B:
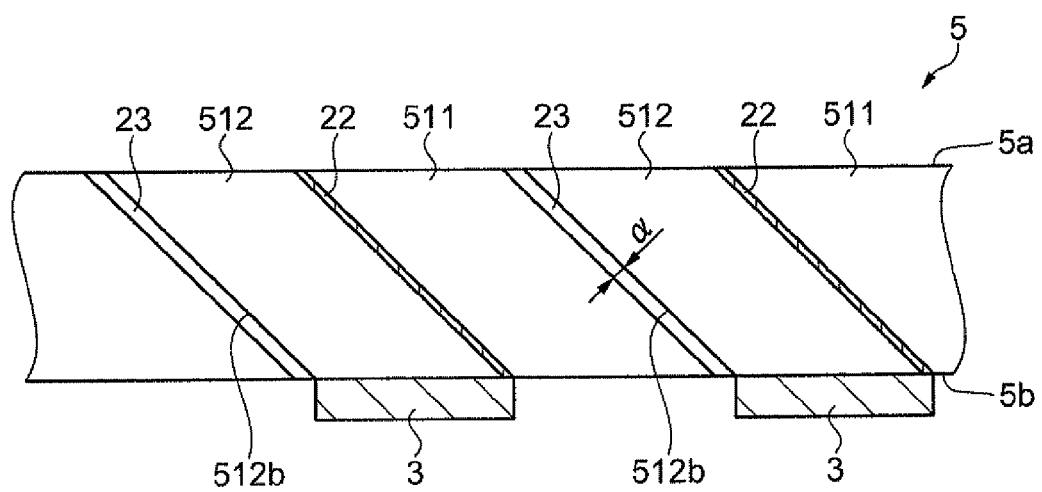
FIG. 13B is an enlarged sectional view showing a part of a polarization conversion element manufactured by using the glass plate shown in FIG. 13A.

FIG. 11A is a plan view of a surface having another uneven shape of a glass plate, and FIG. 11B is an enlarged sectional view of a part of a polarization conversion element manufactured by using the glass plate shown in FIG. 11A. FIG. 13A is a plan view of a surface having yet another uneven shape of a glass plate, and FIG. 13B is an enlarged sectional view of a part of a polarization conversion element manufactured by using the glass plate shown in FIG. 13A. A structure and a manufacturing method other than an uneven shape are same as those of the first embodiment, the first modification, and the second modification, so that description thereof will be omitted.

Referring to FIG. 11A, a large number of concave portions 412b are formed to be aligned in a lattice shape in a planar shape of a face of two faces of a glass plate 412 having a rectangular shape.

The concave portions 412b are formed to have a rectangular shape extending along a cutting line CL direction between convex portions 412a having a width β and including cutting lines CL as center lines along which the glass plate 412 is to be cut in a glass block bonding and cutting step described later. That is, each of the concave portions 412b is formed in the planar shape of the glass plate 412 having a rectangular shape by the convex portions 412a having the width β and the convex portions 412a provided along peripheries of two sides opposed each other in the cutting line CL direction.

The convex portions 412a function as the spacers 24 as the step forming means, and the concave portions 412b form the air gap layers 23 as the air layers. The width β of the convex portions 412a is set in view of adhesiveness in bonding process of glass blocks, but the width β is preferably set to be as small as possible. Further, a depth (γ, refer to FIG. 9) of the concave portions 412b, that is, a height of the convex portions 412a is about 6 μm, and the thickness of an adhesive after curing used in the bonding process of the glass blocks is 4 μm, forming the air gap layers 23 of 10 μm.

Figure 12:
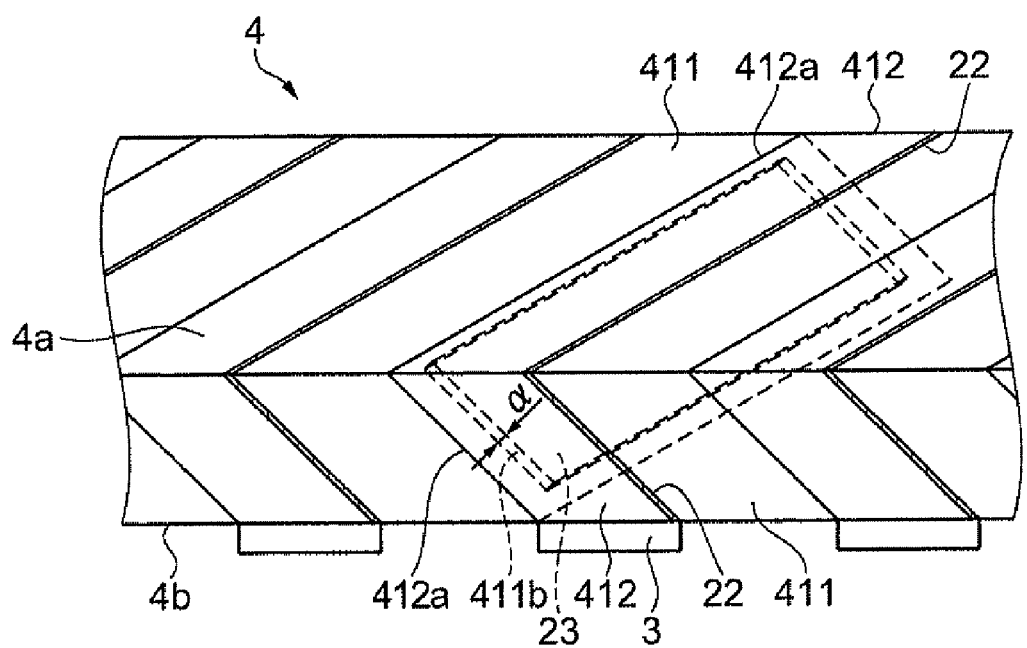
FIG. 12 is a perspective view showing a part of the polarization conversion element shown in FIG. 11B.

FIG. 12 is a perspective view showing a part of the polarization conversion element that is completed. Here, FIG. 12 shows only the air gap layer formed on one inclined plane of the glass materials that are adjacent each other.

Referring to FIGS. 12 and 11B, in a polarization conversion element 4 manufactured by using the glass plate 412 provided with such uneven shape, the convex portions 412a functioning as the spacers 24 are formed along the whole peripheral of the inclined plane of the glass plate 411 and the glass plate 412 that are adjacent, and the air gap layers 23 including the concave portions 412b and having the interval of 10 μm (the depth γ of the concave portions 412b of 6 μm, and the thickness of the adhesive after curing of 4 μm) are formed to be sealed in a manner being insulated from the external atmosphere. That is, in the polarization conversion element 4, the polarization separation films 22 and the air gap layers 23 that are in a sealed state are alternately formed on a plurality of inclined planes forming an angle of approximately 45° with respect to the light incident face 4a and the light emitting face 4b.

Thus, the polarization conversion element 4 manufactured by using the glass plate 412 (refer to FIG. 11A) provided with the concave portions 412b that are formed to be aligned in the lattice shape on the rectangular planar shape prevents humidity (moisture) or fine powders from permeating or attaching the air gap layers 23 so as to maintain high reflection performance (polarization conversion performance) for a long period of time.

On the other hand, referring to FIG. 13A, on a face of two faces of a glass plate 512 having a rectangular shape, a single wide concave portion 512b opened in a left and right direction of a rectangle planar shape is formed in an orthogonal manner to the cutting line CL along which the glass plate 512 is to be cut in a glass block bonding and cutting step described later. That is, the single concave portion 512b is formed between convex portions 512a formed along peripheries of two sides opposed to each other in a cutting line CL direction.

The convex portions 512a formed along the peripheries of two sides opposed to each other in the cutting line CL direction function as the step forming means and the concave portion 512b becomes the air gap layer 23 as an air layer. Since the convex portions 512a are to be regions that are not used for polarization conversion when a polarization conversion element 5 described later is completed, the convex portions 512a are preferably set to have a width as small as possible. Further, a depth (γ, refer to FIG. 9) of the concave portion 512b, that is, a height of the convex portions 512a is about 6 μm, and the thickness of an adhesive after curing used in the bonding step of the glass blocks is 4 μm, forming the air gap layers 23 of 10 μm. Here, a water-repellent treatment similar to the treatment described in the first modification is conducted on the surface of the glass plate 512 on which the concave portion 512b and the convex portions 512a are formed by the uneven processing.

Figure 14:
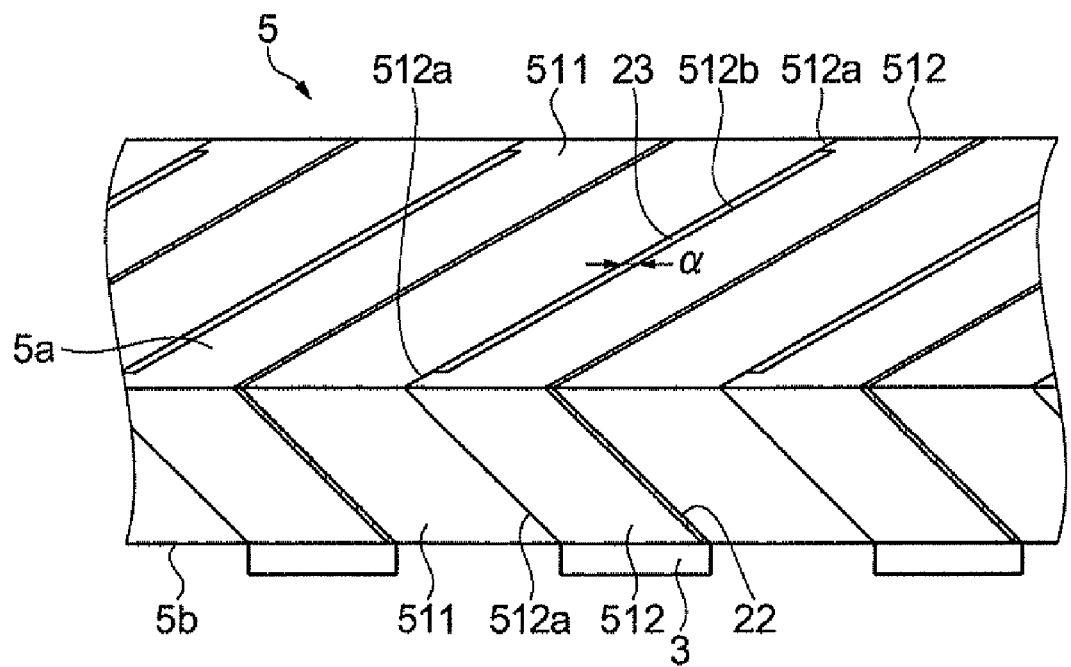
FIG. 14 is a perspective view showing a part of the polarization conversion element shown in FIG. 13B.

FIG. 14 is a perspective view showing a part of the polarization conversion element 5 that is completed.

Referring to FIGS. 14 and 13B, in the polarization conversion element 5 manufactured by using the glass plate 512 (refer to FIG. 13A) provided with such uneven shape, the convex portions 512a functioning as the spacers 24 are formed at both end parts in the longitudinal direction of the inclined planes of the glass plate 511 and the glass plate 512 that are adjacent, and the air gap layers 23 including the concave portion 512b and having the interval α of about 10 μm (the depth of the concave portion 512b of 6 μm, and the thickness of the adhesive after curing of 4 μm) are formed in a manner penetrating the light incident face 5a and the light emitting face 5b. That is, in the polarization conversion element 5, the polarization separation films 22 and the air gap layers 23 that are opened are alternately formed on a plurality of inclined planes forming an angle of approximately 45° with respect to the light incident face 5a and the light emitting face 5b.

The polarization conversion element 5 manufactured by using the glass plate 512 provided with the concave portion 512b in the planar shape of the rectangle to have the uneven shape can use the whole inclined planes as a light functioning face because the air gap layers 23 are continuously formed in regions of the inclined planes. Therefore, a reflection performance in which light-use efficiency (polarization conversion performance) is high can be obtained. Further, the concave portion 512b forming the air gap layers 23 is the single concave portion 512b having a large width, so that operating efficiency for the uneven processing (groove processing) is improved to achieve cost lowering. The air gap layers 23 are continuously formed in the regions of the inclined planes. However, humidity or fine powders under the use environment are prevented from permeating or attaching the air gap layers 23 because the water-repellent coating is conducted on a face provided with the uneven shape (the concave portion 512b and the convex portions 512a) of the glass plate 512.

[Fourth Modification]

The polarization conversion element 1 can convert incident light (including s-polarized light and p-polarized light) into s-polarized light that is a single type of polarized light so as to emit the s-polarized light. However, incident light may be converted into a single type of p-polarized light to be emitted. In this case, the retardation plates 3 having half λ retardation function are disposed on regions, through which the s-polarized light reflected at the reflection face 21b of the polarization separation element 2 passes, of the light emitting face.

The retardation plates 3 may be a retardation film formed such that a retardation layer composed of a polyvinyl alcohol film and the like is sandwiched by triacetyl cellulose films, instead of using quartz (quarts plate) having half λ retardation function.

Further, the retardation plates 3 having half λ retardation function of the polarization conversion element 1 may be a layered retardation plate in which a plurality of retardation plates are layered.

Furthermore, a technical idea of the embodiment can be applied even in the polarization conversion element 1 in which the polarization separation element 2 and the retardation plates 3 are used separately.

Second Embodiment

In a second embodiment, a polarization conversion element includes polarization separation films and retardation plates that are alternately provided on a plurality of inclined planes forming a predetermined angle with respect to a light incident face and a light emitting face thereof. The retardation plates provide phase difference to incident polarized light. A structure other than the retardation plates are same as that in the first embodiment, so that description thereof will be omitted or simplified.

Figure 15A:
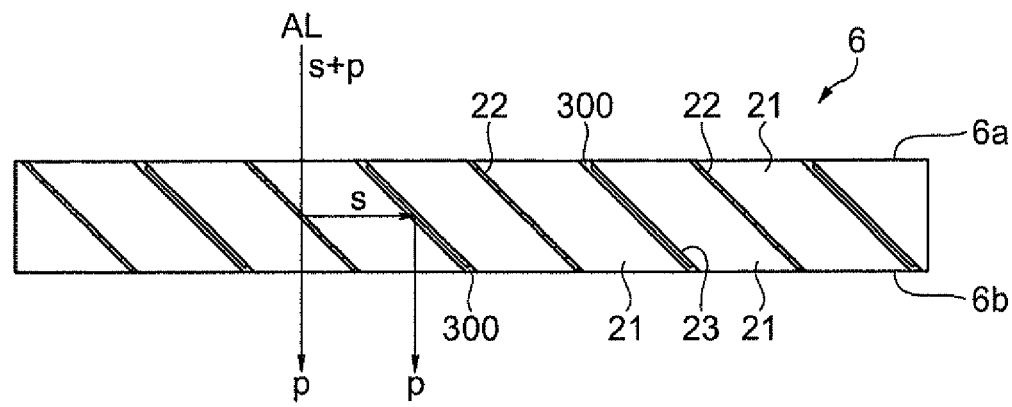
FIG. 15A is a sectional view schematically showing a structure of a polarization conversion element according to a second embodiment.
Figure 15B:
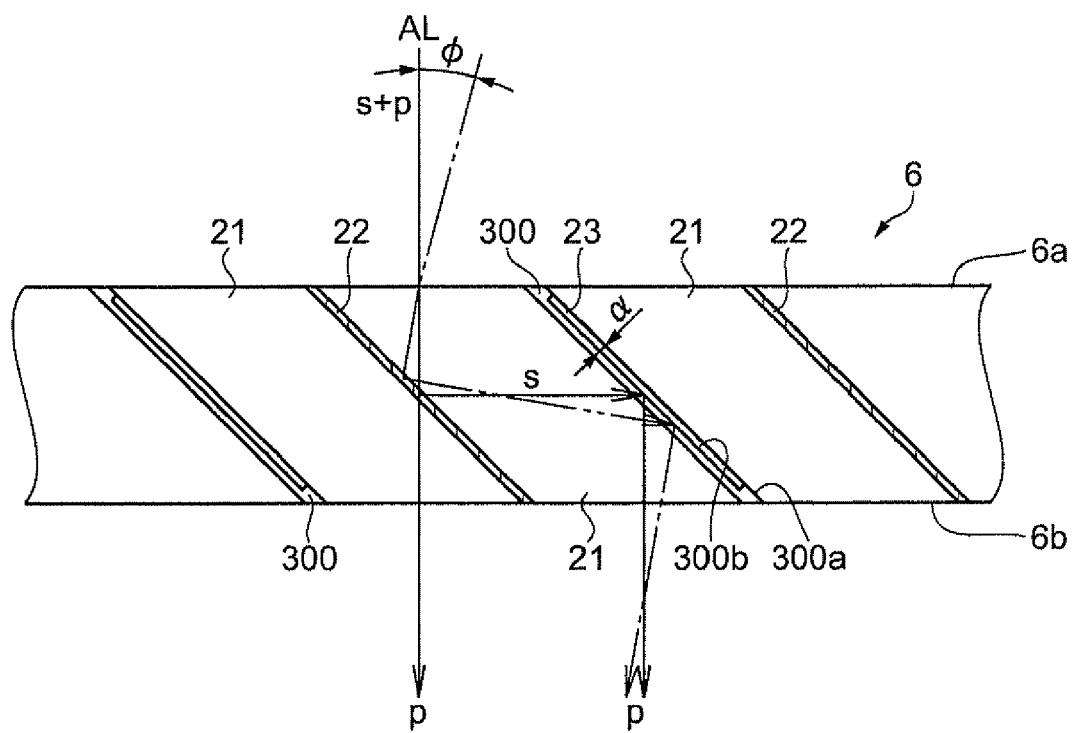
FIG. 15B is an enlarged sectional view showing a part of the polarization conversion element according to the second embodiment.

FIG. 15A is a sectional view schematically showing a structure of a polarization conversion element according to the second embodiment, and FIG. 15B is an enlarged sectional view showing a part of the polarization conversion element according to the second embodiment shown in FIG. 15A. Here, these figures show each element having a different size or proportion from the real one for the convenience of the description below.

Referring to FIGS. 15A and 15B, this polarization conversion element 6 includes glass materials 21, polarization separation films 22, and retardation plates 300. The glass materials 21 are sequentially bonded at a plurality of inclined planes forming a predetermined angle with respect to a light incident face 6a and a light emitting face 6b. The polarization separation elements 22 and the retardation plates 300 are alternately formed along the plurality of inclined planes. The retardation plates 300 form air gap layers 23 as air layers. The predetermined angle formed by the plurality of inclined planes with respect to the light incident face 6a and the light emitting face 6b is, for example, 45°. A cross-sectional shape of the glass materials 21 is an approximate parallelogram.

The glass materials 21 are made of white sheet glass, for example. The polarization separation film 22 is formed on one inclined plane of the glass materials 21, which are aligned adjacent each other, and the retardation plate 300 is bonded along the other inclined plane.

The polarization separation film 22 is a dielectric multilayer film. The dielectric multilayer film is formed, for example, such that an intermediate refractive index layer made of $SiO_2$, a low refractive index layer made of $MgF_2$, and a high refractive index layer made of a mixture containing $La_2O_3$ and $Al_2O_3$ in a weight ratio of 1:3 are layered in a predetermined order and in a predetermined optical film thickness. The polarization separation film 22 separates a bundle of rays of incident light (including s-polarized light and p-polarized light) into s-polarized light and p-polarized light so as to reflect the s-polarized light and transmit the p-polarized light.

The retardation plates 300 are made of quartz (quartz plate) having quarter λ retardation function, and have concave portions 300b and convex portions 300a formed by the uneven processing based on the etching method described in the first and second modifications. Further, a water-repellent treatment similar to the treatment described in the first modification is conducted on the surface, on which the concave portions 300b and the convex portions 300a are formed by the uneven processing, of the retardation plates 300. A refractive index of the retardation plates 300 (quartz plate) is about 1.56.

The concave portions 300b are formed between the convex portions 300a positioned at both end parts, which are at a light incident face 6a and a light emitting face 6b, of the inclined planes to have a depth (γ, refer to FIG. 9) of about 6 μm. The plate thickness of the quartz plate of the retardation plates 300 is at least 10 μm or more. The thickness may be about 1 mm, for example.

The retardation plates 300 structured as above are bonded to regions for the convex portions 300a serving as a bonding face, of the glass materials 21, which are aligned adjacent each other, with an adhesive (not shown) that is to have a thickness of 4 μm after curing.

An interval α formed to include the concave portions 300b forms the air gap layer 23 as an air layer, and bottom surfaces of the concave portions 300b function as a reflection face. The interval α of the air gap layer 23 is about 10 μm (depth of the concave portions 300b of 6 μm, and the thickness of the adhesive after curing of 4 μm).

A movement of incident light incident on the polarization conversion element 6 will be next described.

Referring to FIG. 15B, light (including s-polarized light and p-polarized light) incident on the light incident face 6a of the polarization conversion element 6 along a system optical axis AL is separated into two partial bundle of rays of the s-polarized light and the p-polarized light at the polarization separation film 22. The s-polarized light obtained by the separation by the polarization separation film 22 is reflected toward the retardation plate 300 and the p-polarized light transmits through the polarization separation film 22.

The s-polarized light reflected toward the retardation plate 300 is incident on the retardation plate 300. The s-polarized light incident on the retardation plate 300 transmits through the retardation plate 300 and is incident at approximately 45° on the bottom face (a reflection face), which functions as a reflection face, of the concave portion 300b so as to be reflected. In this reflection, since the polarization conversion element 6 includes the air gap layer 23 having the interval α at the reflection face, no evanescent light (near filed light) leaking at the air gap layer 23 from the reflection face diffuse to the glass material 21 that is next to the air gap layer 23. Thus the light can be reflected at a reflectance of 100% (total reflection). The light reflected by the reflection face again transmits through the retardation plate 300. Thus the s-polarized light that is the incident light transmits through the quarter retardation plate twice to be converted into the p-polarized light and travels toward the light emitting face 6b.

The p-polarized light traveling toward the light emitting face 6b is emitted in almost parallel direction to the system optical axis AL from the light emitting face 6b together with the p-polarized light that transmits through the polarization separation element 22.

That is, the polarization conversion element 6 converts light being incident on the light incident face 6a and vibrating in various directions into the p-polarized light that is a single type of polarized light so as to emit the light from the light emitting face 6b.

Wavelength dispersibility of the polarization conversion element 6 structured as above will be described below.

Figure 16:
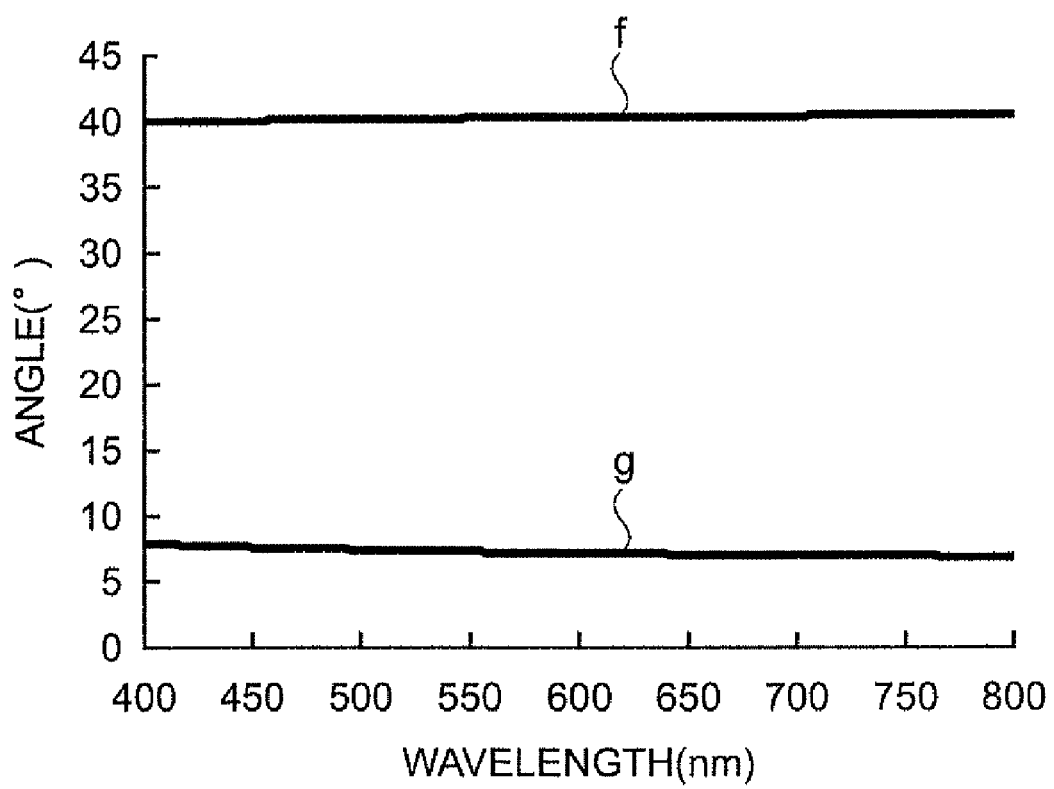
FIG. 16 is a graph showing wavelength dispersibility of a critical angle $\theta_c$ and wavelength dispersibility of a maximum incident angle $\varnothing$, in the polarization conversion element of the second embodiment.

FIG. 16 is a graph showing a wavelength dispersibility of a critical angle $\theta_c$ calculated based on Formula 1 and Formula 2, which are shown in the first embodiment, in the polarization conversion element 6, and showing a wavelength dispersibility of a maximum incident angle ø calculated based on Formula 3. An abscissa axis of the graph indicates a wavelength (nm) of incident light in a wavelength (nm) range from 400 nm to 800 nm, and a longitudinal axis indicates an angle (°).

Referring to FIG. 16, a curve line f indicates wavelength dispersibility of the critical angle $\theta_c$, and a curve line g indicates wavelength dispersibility of the maximum incident angle (−ø). Each of the curve lines is a diagram formed by connecting plot points marked every 1 nm in the wavelength range from 400 nm to 800 nm.

Variation of the critical angle $\theta_c$ shown by the curve line f is small in the visible light range (about 400 nm to about 700 nm). The minimum value is 39.94°, the maximum value is 40.54°, and an average value is 40.33°.

On the other hand, the maximum incident angle (−ø) shown by the curve line g is in a range from 6.87° (wavelength of 800 nm) to 7.90° (wavelength of 400 nm) in the visible light range.

Therefore, the polarization conversion element 6 in which the polarization separation films 22 and the air gap layers 23 are provided to the inclined planes forming an angle of 45° with respect to the light incident face 6a and the light emitting face 6b can obtain total reflection at bottom faces, which are reflection faces, of the concave portions 300b with respect to incident light having a maximum incident angle (−ø) on the light incident face 6a of at least about 7° (at least 6.87°) or less.

Figure 17A:
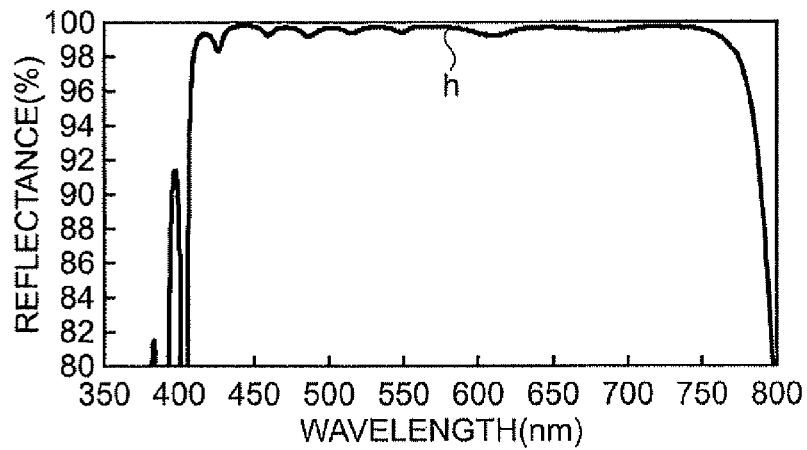
FIGS. 17A to 17C are graphs showing wavelength dispersibility of a reflectance in an incident angle range from −7° to +7° on a light incident face of a related art polarization conversion element.
Figure 17B:
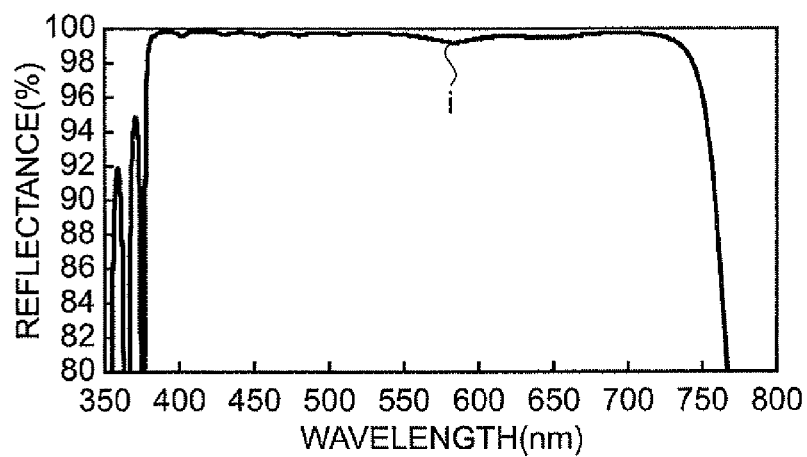
Figure 17C:
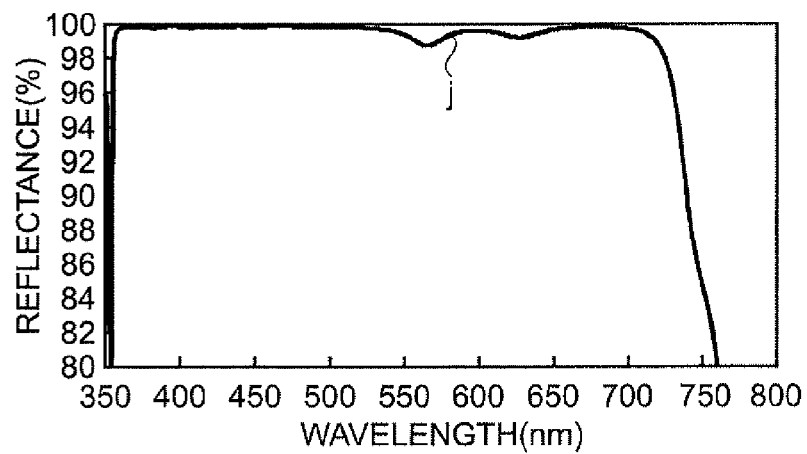

On the other hand, FIGS. 17A to 17C show wavelength dispersibility of incident light in a range from −7° to +7° in a related art common polarization conversion element 50 (refer to FIGS. 22A and 22B) in which polarization separation films 51b and reflection films 51c are formed alternately on a plurality of inclined planes.

FIGS. 17A to 17C show the wavelength dispersibility of incident light having an incident range from −7° to +7° on a light incident face substituted for the incident light having the incident range from −5° to +5° on the light incident face according to the first embodiment shown in FIGS. 4A to 4C. Therefore, a film of the reflection film 51c formed on an inclined plane of the polarization conversion element 50 is the dielectric multilayered film composed of 31 layers shown in Table 1 in the first embodiment.

FIGS. 17A to 17C are graphs showing wavelength dispersibility of a reflectance of the reflection film 51c depending on an incident angle of incident light on the light incident face. FIG. 17A shows a case of an incident angle of −7°, FIG. 17B shows a case of an incident angle of 0°, and FIG. 17C shows a case of an incident angle of +7°.

An abscissa axis of the graphs indicates a wavelength (nm) of incident light in a wavelength range from 350 nm to 800 nm, and a longitudinal axis indicates a reflectance (%). Each of curve lines h, i, and j is a diagram formed by connecting plot points marked every 1 nm in the wavelength range from 350 nm to 800 nm.

Referring to FIGS. 17A to 17C, a reflectance is low in a low wavelength range and a high wavelength range that are out of the visible light wavelength range in each of the cases of the incident angle of +7° (the curve line h), the incident angle of 0° (the curve line i), and the incident angle of +7° (the curve line j). A low reflectance range shifts toward a high wavelength side as the incident angle shifts from +7° to −7°. The reflectance in the cases of the incident angle of 0° and the incident angle of +7° in the visible light wavelength range are high about 98.7% or more, but the reflectance in the case of the incident angle of +7° is extremely low around a wavelength of 400 nm. Further, all of the curve lines have an uneven shape thereon indicating reflection loss. This loss occurs because the polarized light is absorbed by the reflection film 51c composed of the dielectric multilayer film.

As above, the polarization conversion element 6 includes the glass materials 21, the polarization separation films 22, and the retardation plates 300 forming the air gap layers 23 as air layers. The glass materials 21 are bonded on a plurality of inclined planes forming a predetermined angle with respect to the light incident face 6a and the light emitting face 6b. The polarization separation films 22 and the retardation plates 300 are alternately formed on the plurality of inclined planes. Accordingly, the polarization conversion element 6 can obtain an excellent reflection performance (polarization conversion performance) corresponding to an incident angle in a wide range of incident light. Further, the retardation plates 300 are composed of quartz plates that are stable physically and scientifically and are disposed inside the polarization conversion element 6. Therefore, the polarization conversion element 6 having excellent thermal-resistance and light-resistance can be obtained.

A manufacturing method of the polarization conversion element 6 will be next described.

The manufacturing method of the polarization conversion element 6 described below basically conforms the manufacturing method of the first embodiment. Therefore, only a manufacturing process of elements which are different from those of the polarization conversion element of the first embodiment will be described.

Figure 18A:
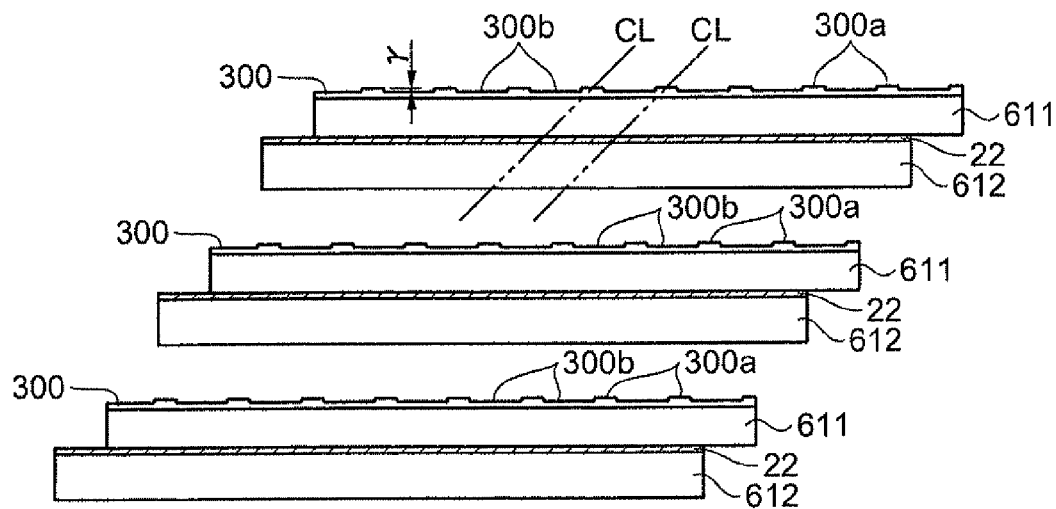
FIGS. 18A and 18B are sectional views showing a main process for manufacturing the polarization conversion element according to the second embodiment.
Figure 18B:
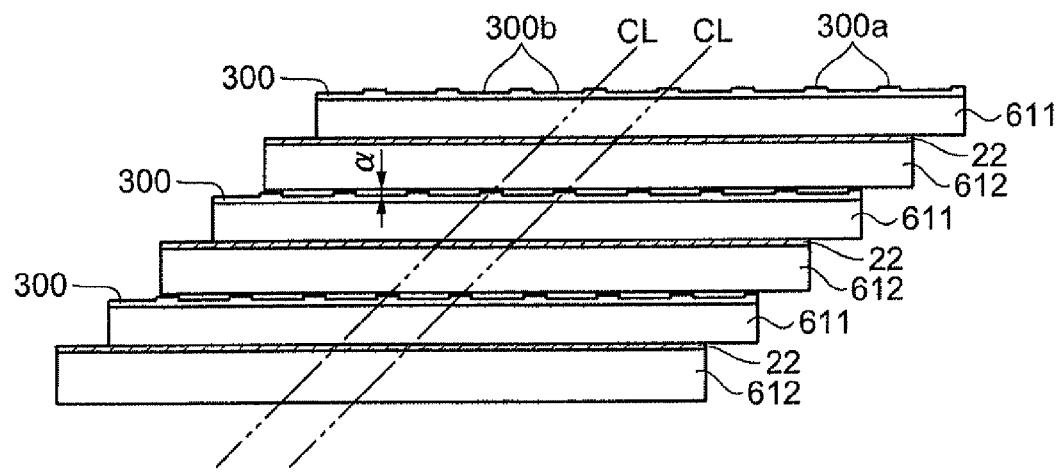

FIG. 18A is a sectional view showing a glass block forming step in a manufacturing process of a polarization separation element according to a second embodiment. FIG. 18B is a sectional view showing a glass block bonding and cutting step in the manufacturing process of the polarization separation element of the second embodiment.

In the glass block forming step shown in FIG. 18A, glass plates 611 and 612 prepared in a preparing step and the retardation plates 300 are bonded to each other with an adhesive (not shown) so as to form glass blocks.

On one face of two faces of each of the glass plates 612 prepared, the polarization separation film 22 is formed in advance. These glass plates 611 and the glass plates 612 are made of white sheet glass respectively having rectangular shapes and predetermined thicknesses. The glass plates 611 and 612 later form a columnar shape glass material 21 of which a cross-sectional shape is an approximate parallelogram.

The retardation plates 300 are made of quartz (quartz plates) having a rectangular shape that is nearly same as that of the glass material 21 and having quarter λ retardation function. On one face of each of the retardation plates 300, concave portions 300b and convex portions 300a are formed in advance in a lattice shape by the uneven processing based on the etching method described in the first modification. The concave portions 300b and the convex portions 300a form air gap layers 23 later.

A plate thickness of the quartz plate of the retardation plates 300 is, for example, 15 μm, and a depth γ of the concave portions 300b (that is, a height of the convex portions 300a) is about 6 μm. The plate thickness of the quartz plate can be adequately set by selecting a cutting axis direction and an optical axis direction of quarts that is used.

An uneven shape formed by the uneven processing may be provided in a lattice shape in a rectangular planar shape (refer to FIG. 11A) or be formed by a single wide concave portion that is opened in a right and left direction on the rectangular planar shape (refer to FIG. 13A) as described in the third modification.

Then a face opposed to the face provided with the concave portions 300b and the convex portions 300a of each of the retardation plates 300 and one face of each of the glass plates 611 are bonded to each other with an adhesive (not shown). Further, a face, opposed to the face on which the retardation plate 300 is bonded, of the glass plates 611 and a face, on which the polarization separation film 22 is formed, of the glass plates 612 are bonded to each other with an adhesive (not shown) so as to form a plurality of glass blocks.

In the glass block bonding and cutting step shown in FIG. 18B, an adhesive is applied to a surface of the convex portions 300a formed in the lattice shape on the retardation plates 300 included in the glass blocks so as to bond the plurality of glass blocks to each other, and then the bonded body is cut along the cutting lines CL.

The glass blocks are positioned such that approximate center lines of the convex portions 300a formed in the lattice shape on the retardation plates 300 correspond to the cutting lines CL so as to be bonded to each other.

Then the plurality of glass blocks bonded and fixed to each other are cut nearly parallel at positions of the cutting lines CL (denoted by a dashed two dotted line) forming an angle of approximately 45° with respect to the surface of the blocks so as to cut out element blocks. One cutting face of the element blocks cut out at the cutting lines CL corresponds to the light incident face 6a of the polarization conversion element 6 and the other cutting face corresponds to the light emitting face 6b.

Both end faces of the element blocks that are obtained are shaped to have a predetermined shape, completing the polarization conversion element 6.

Figure 19:
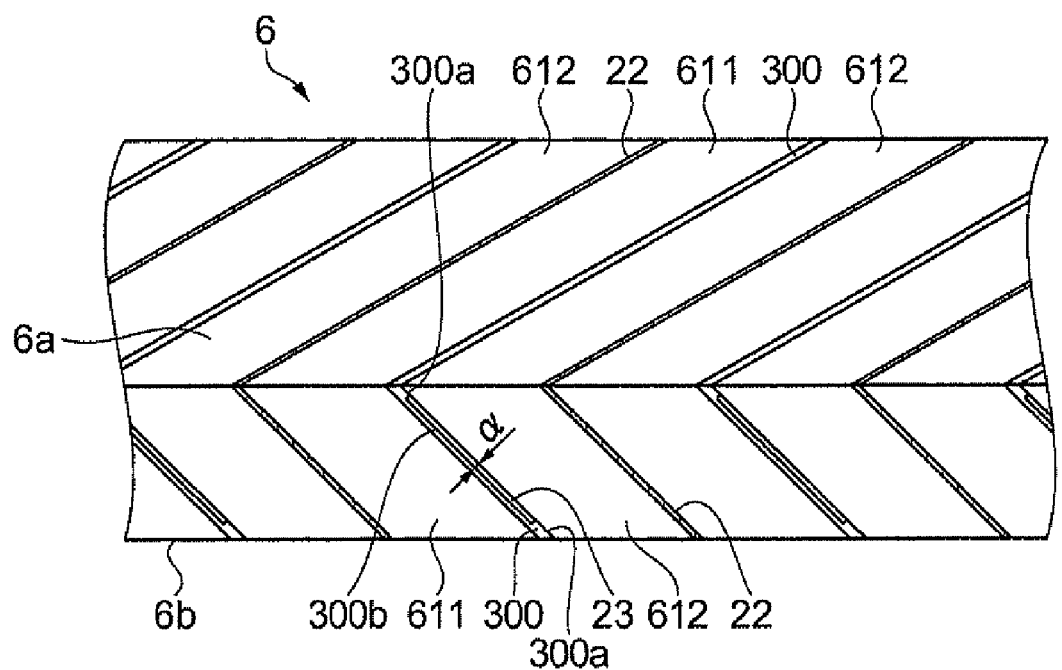
FIG. 19 is a perspective view showing a part of the polarization conversion element according to the second embodiment.

FIG. 19 is a perspective view showing a part of the polarization element 6 that is completed.

Referring to FIGS. 19 and 15B, in the polarization conversion element 6 that is completed, the polarization separation films 22 and the retardation plates 300 forming the air gap layers 23 serving as air layers are alternately formed on a plurality of inclined planes forming an angle of approximately 45° with respect to the light incident face 6a and the light emitting face 6b. The retardation plate 300 includes the air gap layer 23 that is formed to include the concave portion 300b between the convex portions 300a formed along the light incident face 6a and the light emitting face 6b and have an interval α of 10 μm (a depth γ of the concave portions 300b of 6 μm, and a thickness of the adhesive after curing of 4 μm). The polarization conversion element 6 converts light being incident on the light incident face 6a and vibrating in various directions into the p-polarized light that is a single type of polarized light so as to emit the light from the light emitting face 6b.

Third Embodiment

In a third embodiment, a polarization conversion element includes optical functioning layers composed of a polarization separation film and a retardation plate giving phase difference to incident polarized light; and air gap layers as serving as air layers. The optical functioning layers and the air gap layers are alternately provided on a plurality of inclined planes forming a predetermined angle with respect to a light incident face and a light emitting face of the polarization conversion element. Structures other than the retardation plates are same as those in the first and second embodiments, so that description thereof will be omitted or simplified.

Figure 20A:
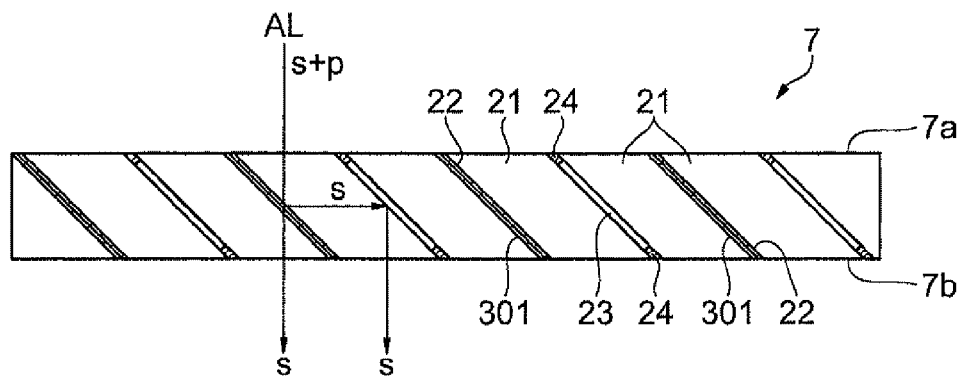
FIG. 20A is a sectional view schematically showing a structure of a polarization conversion element according to a third embodiment.
Figure 20B:
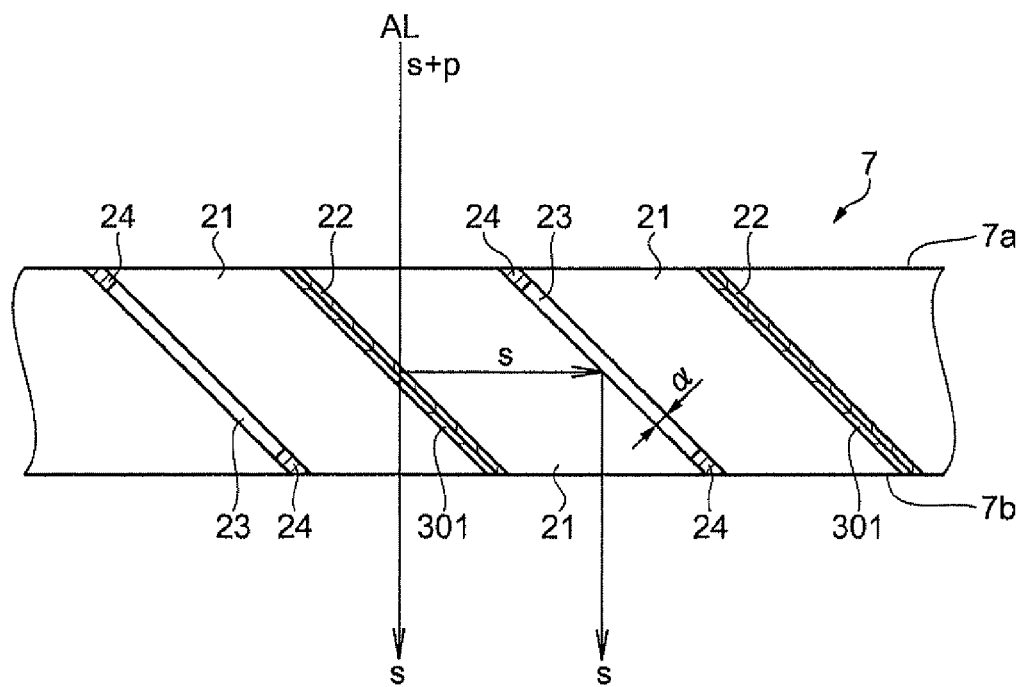
FIG. 20B is an enlarged sectional view showing a part of the polarization conversion element according to the third embodiment.

FIG. 20A is a sectional view schematically showing a structure of a polarization conversion element according to the third embodiment, and FIG. 20B is an enlarged sectional view showing a part of the polarization conversion element according to the third embodiment shown in FIG. 20A. Here, these figures show each element having a different size or proportion from the real one for the convenience of the description below.

Referring to FIGS. 20A and 20B, this polarization conversion element 7 includes glass materials 21 as light transmitting base materials, optical functioning layers composed of a polarization separation film 22 and a retardation plate 301, and air gap layers 23 as air layers. The glass materials 21 are sequentially bonded at a plurality of inclined planes forming a predetermined angle with respect to a light incident face 7a and a light emitting face 7b. The optical functioning layers and the air gap layers 23 are alternately formed along the plurality of inclined planes. An angle formed by the plurality of inclined planes with respect to the light incident face 7a and the light emitting face 7b is, for example, 45°. A cross-sectional shape of the glass materials 21 is an approximate parallelogram.

The glass materials 21 are made of white sheet glass, for example. The optical functioning layer composed of the polarization separation film 22 and the retardation plate 301 that is bonded to a surface of the polarization separation element 22 is formed on one inclined plane of the glass materials 21, which are aligned adjacent each other, and the air gap layer 23 as an air layer is formed on the other inclined plane.

The polarization separation film 22 is a dielectric multilayer film. The dielectric multilayer film is formed, for example, such that an intermediate refractive index layer made of $SiO_2$, a low refractive index layer made of $MgF_2$, and a high refractive index layer made of a mixture containing $La_2O_3$ and $Al_2O_3$ in a weight ratio of 1:3 are layered in a predetermined order and in a predetermined optical film thickness. The polarization separation film 22 separates a bundle of rays of incident light (including s-polarized light and p-polarized light) into s-polarized light and p-polarized light so as to reflect the s-polarized light and transmit the p-polarized light.

The retardation plate 301 is made of quartz (is a quartz plate) having half $\lambda$ retardation function. The retardation plate 301 has a function of converting the p-polarized light transmitting through the polarization separation film 22 and being incident thereon into s-polarized light.

The air gap layers 23 as air layers are layers of air, and are formed by spacers 24 serving as step forming means and being formed at inclined planes of the glass materials 21 that are adjacent each other. The spacers 24 are made of an adhesive (adhesive layer) bonding the glass materials 21 that are adjacent along the light incident face 7a and the light emitting face 7b. A height of the spacers 24, that is, an interval $\alpha$ is about 10 μm.

A movement of incident light incident on the polarization conversion element 7 structured as above will be next described.

Referring to FIG. 20B, light (including s-polarized light and p-polarized light) incident on the light incident face 7a of the polarization conversion element 7 along a system optical axis AL is separated into two partial bundle of rays of the s-polarized light and the p-polarized light at the polarization separation film 22 in the optical functioning layer formed on one inclined plane of the glass material 21. The s-polarized light obtained by the separation by the polarization separation film 22 is reflected toward the air gap layer 23 and the p-polarized light transmits through the polarization separation film 22.

Then the s-polarized light that is reflected toward the air gap layer 23 is incident at an angle of 45° on the other face (reflection face) of the glass material 21 forming the air gap layer 23 so as to be reflected. In this reflection, since the polarization conversion element 7 includes the air gap layer 23 having an interval $\alpha$ at the reflection face, no evanescent light (near filed light) leaking at the air gap layer 23 from the reflection face diffuses to the glass material 21 that is next to the air gap layer 23. Thus the light can be reflected at a reflectance of 100% (total reflection). The reflected light that is totally reflected travels toward the light emitting face 7b.

On the other hand, the p-polarized light that transmits through the polarization separation film 22 is incident on the retardation plate 301 adjacent to the polarization separation film 22 in the optical functioning layer.

The p-polarized light incident on the retardation plate 301 passes through the inside of the retardation plate 301 to travel toward the light emitting face 7b. The p-polarized light incident on the retardation plate 301 is converted into s-polarized light by passing through the retardation plate 301.

Then the s-polarized light traveling toward the light emitting face 7b is emitted nearly parallel to the system optical axis AL together with the s-polarized light that is totally reflected at the reflection face of the glass material 21 forming the air gap layer 23 from the light emitting face 7b.

That is, the polarization conversion element 7 converts light being incident on the light incident face 7a and vibrating in various directions into the s-polarized light that is a single type of polarized light so as to emit the light from the light emitting face 7b.

Thus, the polarization conversion element 7 includes the glass materials 21, the optical functioning layers composed of the polarization separation element 22 and the retardation plate 301, and the air gap layers 21 as air layers. The glass materials 21 are bonded to each other at a plurality of inclined planes forming a predetermined angle with respect to the light incident face 7a and the light emitting face 7b. The optical functioning layers and the air gap layers 23 are alternately formed on the plurality of inclined planes. Therefore, the polarization conversion element 7 having excellent reflection performance (polarization conversion performance) can be obtained. Further, the retardation plates 301 are made of the quartz plate that is stable physically and scientifically, and are disposed inside of the polarization conversion element 7. Therefore, the polarization conversion element 7 having excellent thermal-resistance and light-resistance can be obtained.

A manufacturing method of the polarization conversion element 7 will be next described.

The manufacturing method of the polarization conversion element 7 described below basically conforms the manufacturing method of the first embodiment. Therefore, only a manufacturing process of elements which are different from those of the polarization separation element of the first embodiment will be described.

Figure 21A:
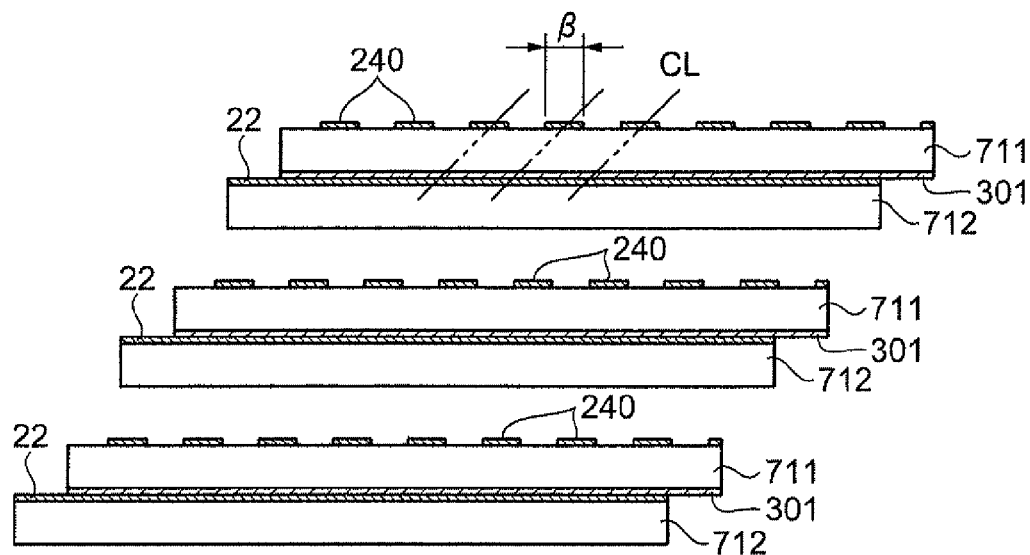
FIGS. 21A and 21B are sectional views showing a main process for manufacturing the polarization conversion element according to the third embodiment.
Figure 21B:
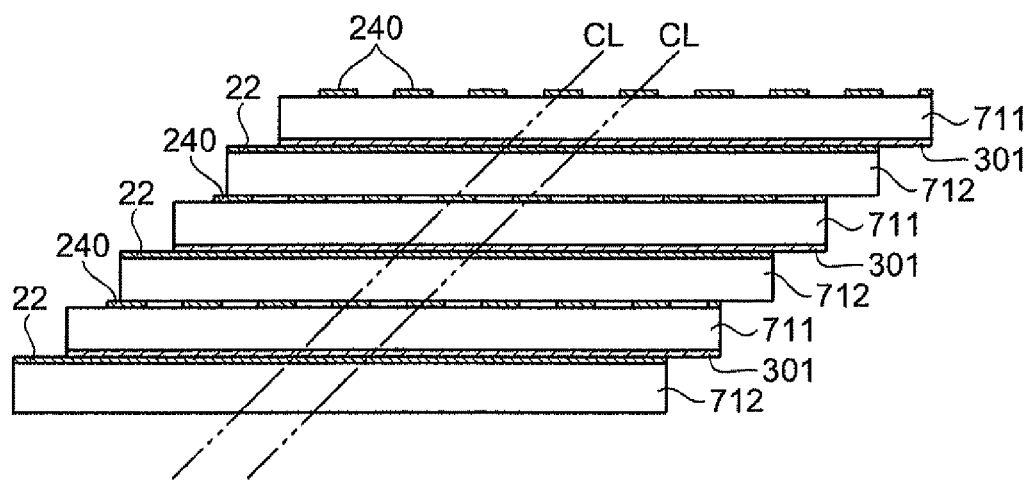

FIG. 21A is a sectional view showing a glass block forming step in a manufacturing process of a polarization separation element according to the third embodiment. FIG. 21B is a sectional view showing a glass block bonding and cutting step in the manufacturing process of the polarization separation element of the third embodiment.

In the glass block forming step shown in FIG. 21A, glass plates 711 and 712 prepared in a preparing step and the retardation plates 301 are bonded to each other with an adhesive (not shown) so as to form glass blocks.

The glass plates 711 and 712 prepared are made of white sheet glass respectively having rectangular outer shapes and predetermined thicknesses. On one face of two faces of the glass plates 712, the polarization separation film 22 is formed in advance. The glass plates 711 and 712 later form a columnar glass material 21 having an approximate parallelogram cross-sectional shape.

The retardation plates 301 are made of quartz (quartz plates) having a rectangular shape that is nearly same as that of the glass plates 711 and 712 and having half λ retardation function. A plate thickness of the quartz plate of the retardation plate 301 is, for example, about 15 μm. The plate thickness can be adequately set by selecting a cutting axis direction and an optical axis direction of quartz that is used.

Then the retardation plate 301 is bonded to one face of each of the glass plates 711 with an adhesive (not shown). After that, the surface of the retardation plate 301 bonded to the glass plate 711 and a face, on which the polarization separation film 22 is formed, of the glass plate 712 are bonded with an adhesive (not shown).

Then an adhesive (adhesive layer) 240 is applied to the surface of the glass plates 711. The adhesive 240 is applied to have center lines corresponding to the cutting lines CL, along which a bonded body is cut in a step shown in FIG. 21B and described later, that are orthogonal to the surface of the glass plate 711. Thus, the adhesive 240 is formed in a lattice shape along a side of the rectangular outer shape of the glass plate 711 (refer to FIG. 7). Here, the thickness of the adhesive 240 after it is applied and hardened is about 10 μm.

In the glass block bonding and cutting step shown in FIG. 21B, after the plurality of glass blocks in which the adhesive 240 is applied to the surface of the glass plate 711 in a lattice shape are bonded to each other, the bonded body is cut along the cutting lines CL.

The glass block bonding is conducted such that a face, on which the adhesive 240 is applied, of the glass plate 711 of one glass block and a face of the glass plate 712 of another glass block are bonded in a manner positioning the center lines of the adhesive 240, which is applied to one face of two faces of the glass plate 711 of the glass block in the lattice shape, on the cutting lines CL. Then the adhesive 240 is hardened by being irradiated with light (ultraviolet ray) of a chemical lamp or a high pressure mercury lamp.

Thus, the plurality of glass blocks are bonded and fixed.

The plurality of glass blocks bonded and fixed to each other are cut in nearly parallel at positions of the cutting lines CL (denoted by a dashed two dotted line) forming an angle of approximately 45° with respect to the surface of the blocks so as to cut out element blocks. One cutting face of the element blocks cut out at the cutting lines CL corresponds to the light incident face 7a of the polarization conversion element 7 and the other cutting face corresponds to the light emitting face 7b.

Both end faces of the element blocks that are obtained are shaped to have a predetermined shape, completing the polarization conversion element 7.

The entire disclosure of Japanese Patent Application Nos: 2007-260621, filed Oct. 4, 2007, 2007-215613, filed Aug. 8, 2007 and 2008-156293, filed Jun. 16, 2008 are expressly incorporated by reference herein.

What is claimed is:

1. A polarization conversion element, comprising:
a plurality of light transmitting substrates sequentially bonded at a plurality of inclined planes thereof that form an angle of approximately 45° with respect to a light incident face and a light emitting face being approximately parallel to the light incident face;
a retardation plate providing a phase difference to incident polarized light;
a polarization separation film separating incident light into two types of polarized light; and
an air layer, wherein
the polarization separation film and the air layer are alternately on the plurality of inclined planes that are sequentially bonded,
the light transmitting substrates adjacent each other at the air gap layer have reflection faces, and the air layer has a gap, in a direction orthogonal to the reflection faces, of about 10μm with respect to incident light in a visible light wavelength range from approximately 400nm to approximately 700nm,
the air gap layer includes spacers formed on the plurality of inclined planes of the light transmitting substrates that are adjacent to each other, and
a height of the spacers in the direction orthogonal to the reflection faces is the same as the gap of the air layer.

2. The polarization conversion element according to claim 1, wherein the retardation plate is a half wave plate and is selectively disposed along the light emitting face.

3. A polarization conversion element, comprising:
a plurality of light transmitting substrates sequentially bonded at a plurality of inclined planes thereof that form an angle of approximately 45° with respect to a light incident face and a light emitting face being approximately parallel to the light incident face;
a retardation plate providing a phase difference to incident polarized light;
a polarization separation film separating incident light into two types of polarized light; and
an air layer, wherein
the polarization separation film and the air layer are alternately on the plurality of inclined planes that are sequentially bonded,
the light transmitting substrates being adjacent to each other at the air gap layer have reflection faces, and the air layer has a gap, in a direction orthogonal to the reflection faces,
the air gap layer includes spacers formed on the plurality of inclined planes of the light transmitting substrates that are adjacent to each other,
a height of the spacers in the direction orthogonal to the reflection faces is the same as the gap of the air layer, and
there are a plurality of retardation plates alternately formed along the plurality of inclined planes, each retardation plate is a quarter wave plate and is disposed adjacent to a light incident side of the air layer that is provided on the plurality of inclined planes, the light incident side of the air layer is the side on which the polarized light, obtained by the separation via the polarization separation film, is incident.

4. The polarization conversion element according to claim 1, wherein the retardation plate is a half wave plate and is disposed adjacent to a light emitting side of the polarization separation film provided on the plurality of inclined planes.

5. The polarization conversion element according to claim 2, wherein a refractive index of the light transmitting substrates is 1.45 or more, and less than 1.65.

6. The polarization conversion element according to claim 4, wherein a refractive index of the light transmitting substrates is 1.45 or more, and less than 1.65.

7. The polarization conversion element according to claim 2, wherein the spacers are provided at both end parts in a longitudinal direction of the plurality of inclined planes, and the air layer sandwiched by the plurality of light transmitting substrates is exposed at each of the light incident face and the light emitting face.

8. The polarization conversion element according to claim 4, wherein the spacers are provided at both end parts in a longitudinal direction of the plurality of inclined planes, and the air layer sandwiched by the plurality of light transmitting substrates is exposed at each of the light incident face and the light emitting face.

9. The polarization conversion element according to claim 2, wherein the spacers are provided along the light incident face and the light emitting face.

10. The polarization conversion element according to claim 4, wherein the spacers are provided along the light incident face and the light emitting face.

11. The polarization conversion element according to claim 2, wherein the spacers are provided along a whole periphery of the inclined planes.

12. The polarization conversion element according to claim 4, wherein the spacers are provided along a whole periphery of the inclined planes.

13. A method for manufacturing a polarization conversion element, the polarization conversion element including: a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer, in which the polarization separation film and the air layer are alternately formed along the plurality of inclined planes, the method comprising:
forming a convex portion on the plurality of inclined planes so as to form the air layer.

14. The method for manufacturing a polarization conversion element according to claim 13, wherein the convex portion is formed by an adhesive layer used for bonding the plurality of inclined planes.

15. A method for manufacturing a polarization conversion element, the polarization conversion element including: a plurality of light transmitting substrates sequentially bonded at a plurality of inclined planes thereof that form an angle of approximately 45° with respect to a light incident face and a light emitting face being approximately parallel to the light incident face; a retardation plate providing a phase difference to incident polarized light; a polarization separation film separating incident light into two types of polarized light; and an air layer, in which the polarization separation film and the air layer are alternately formed along the plurality of inclined planes, the method comprising:
forming a concave portion on the plurality of inclined planes so as to form the air layer.

16. The method for manufacturing a polarization conversion element according to claim 15, wherein the concave portion is formed by an etching method.

17. The method for manufacturing a polarization conversion element according to claim 15, wherein the concave portion is formed by a microblasting method.

* * * * *